United States Patent
Adachi et al.

(10) Patent No.: US 7,339,864 B2
(45) Date of Patent: Mar. 4, 2008

(54) METHOD AND APPARATUS FOR SETTING RECORDING CONDITION, RECORDING AND REPRODUCING APPARATUS, RECORDING CONDITION SETTING PROGRAM, AND RECORDING MEDIUM

(75) Inventors: Yoshihisa Adachi, Soraku-gun (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 621 days.

(21) Appl. No.: 11/003,173

(22) Filed: Dec. 2, 2004

(65) Prior Publication Data
US 2005/0122872 A1  Jun. 9, 2005

(30) Foreign Application Priority Data
Dec. 4, 2003 (JP) ............................. 2003-406269
Nov. 15, 2004 (JP) ............................. 2004-331062

(51) Int. Cl.
*G11B 7/00* (2006.01)

(52) U.S. Cl. .................................................. 369/47.53

(58) Field of Classification Search ................ 369/116, 369/47.5, 47.51, 47.52, 47.53
See application file for complete search history.

(56) References Cited

U.S. PATENT DOCUMENTS 6,791,926 B1 * 9/2004 Furumiya et al. ......... 369/53.13

FOREIGN PATENT DOCUMENTS

| JP | 2000-200418 | 7/2000 |
|---|---|---|
| JP | 2004-139649 | 5/2004 |
| JP | 2000-182244 | 6/2004 |

* cited by examiner

*Primary Examiner*—Nabil Hindi
(74) *Attorney, Agent, or Firm*—Edwards Angell Palmer & Dodge; David G. Conlin

(57) ABSTRACT

A recording pulse condition for obtaining a reproduction result which fulfills predetermined signal quality is sought by performing testwrite and reproduction after uniformly changing predetermined recording pulse conditions corresponding to all mark lengths (S1, S2). If good result is not obtained, a recording pulse condition for obtaining a reproduction result which fulfills predetermined signal quality is sought by performing testwrite and reproduction after changing a predetermined recording pulse condition corresponding to at least one mark length (S4, S5). Then, a recording pulse condition is determined (S3). Thus provided are method and apparatus for efficiently setting such a recording condition that can reduce the influence of difference in characteristics of writable optical disks and difference in characteristics of optical recording and reproducing apparatuses, and to provide a recording and reproducing apparatus.

69 Claims, 21 Drawing Sheets

METHOD AND APPARATUS FOR SETTING RECORDING CONDITION, RECORDING AND REPRODUCING APPARATUS, RECORDING CONDITION SETTING PROGRAM, AND RECORDING MEDIUM

This nonprovisional application claims priority under 35 U.S.C. § 119(a) on Patent Application No. 406269/2003 filed in Japan on Dec. 4, 2003, and Patent Application No. 331062/2004 filed in Japan on Nov. 15, 2004. The entire contents of these applications are hereby incorporated by reference.

FIELD OF THE INVENTION

The present invention relates in general to a recording and reproducing apparatus for performing light modulation recording in accordance with a recording condition based on recorded data, and more specifically, to method and apparatus for setting the recording condition, a recording condition setting program, and a recording medium, which are used with the recording and reproducing apparatus.

BACKGROUND OF THE INVENTION

In a recording and reproducing apparatus such as an optical disk drive for recording large-volume data, a pulse row that changes in accordance with data is converted into a pulse row finer than a minimum data unit. The fine pulse row is used to modulate the intensity of a laser beam. When intensity-modulated laser beam is focused onto a recording medium, heat is applied to the recording medium. This changes physical characteristics of the recording medium, thereby forming recorded marks. In this way, data is recorded in the recording medium. Setting data on a pulse width required for recording (required to form the recorded marks) and setting data on a recording condition for performing recording compensation with respect to, for example, the power of each laser beam are recorded in advance as predetermined data in an optical disk (in the following description, an optical disk may be simply referred to as "disk").

Incidentally, increasingly densified optical disks require more accurate setting, such as a setting in which a standard recording condition is set with respect to each mark length (size of a recorded mark in the track direction) or with respect to each combination of mark length and space (between recorded marks) length. In high-density recording, the mark length and space length are short. Therefore, when heat of the laser beam is applied so as to form a mark, the heat affects not only the mark but also adjacent marks through spaces. As a result, the mark and the adjacent marks are distorted. This is the reason why accurate setting is required.

However, if recording and reproducing apparatuses (in the following description, a recording and reproducing apparatus may be simply referred to as "apparatus") are mass produced, the apparatuses do not always have the same characteristics, because the members used may have different characteristics, and because the production environment can be different, for example. For example, laser drive means and a head provided with a laser, which are members associated with recording, can be different from apparatus to apparatus. This is primarily due to difference in laser characteristics. If there is difference in laser characteristics, the pulse width can be different even if the waveform of the current supplied to the laser of each apparatus is the same.

As a result, the waveform of the emitted light is not always the same. The difference in laser characteristics include difference in laser drive means (laser drive circuit), in addition to difference in the laser itself. Likewise, optical disks are also different in characteristics when mass produced. Therefore, the shape of the recorded marks is not always the same even if recording is performed under the same condition with respect to each optical disk.

Thus, if mass-produced optical disks and recording and reproducing apparatuses having different characteristics are used in certain combination, recording and reproduction cannot be performed appropriately, even if standard disks having standard characteristics are used under a standard recording condition determined by a standard apparatus having standard characteristics. This results in deterioration of quality.

If such disks that are manufactured under sufficient quality control and therefore have little difference in characteristics are used, no significant problem will arise. However, if the recording pulse standard condition recorded in the disks in advance has a large gap with disk performance, the disks cannot demonstrate their characteristics even if the recording pulse standard condition is read out of the disks and reproduced with high fidelity.

To solve these problems, Japanese Publication for Laid-Open Patent Application, Tokukai 2000-200418 (publication date: Jul. 18, 2000) (hereinafter "Patent Publication 1") discloses a method of determining a recording condition by modifying the standard recording condition. In this method, in an optical disk in which a standard recording pulse conditions are recorded in advance in a specific zone, positional data with respect to all combinations or one combination of the mark length and space length, (all the combinations or one combination of the mark length and space length are part of the standard recording pulse condition) is changed in advance by a predetermined amount. By so doing, a corrected value of the standard recording pulse condition that makes jitter of recording and reproducing signals not higher than an acceptable value is set as the recording pulse condition of the recording and reproducing apparatus.

According to this method, to solve the problem that the pulse width changes primarily due to the difference in laser characteristics, all the combinations of mark length and space length are changed uniformly by the predetermined amount. To solve the problem that, if the recording pulse standard condition recorded in the disks in advance has a large gap with disk performance, the disks cannot demonstrate their characteristics even if the recording pulse standard condition is read out of the disks and reproduced with high fidelity, part of all combinations of mark length and space length are changed individually.

According to a method disclosed in Japanese Publication for Laid-Open Patent Application, Tokukai 2000-182244 (publication date: Jun. 30, 2000) (hereinafter "Patent Publication 2"), testwrite is performed in accordance with a plurality of recording powers and a plurality of laser emitted light waveform rules (pulse widths), and both a recording power and a pulse width are determined in accordance with a result of the testwrite.

Publication 1 teaches that, in one method for setting a recording pulse condition, all the combinations of the mark length and space length (all the combinations of the mark length and space length are part of the standard recording pulse condition) are changed uniformly or individually by a predetermined amount.

However, for example, Publication 1 does not consider such cases where the difference in laser characteristics, which requires to change the recording pulse condition uniformly, and the difference in disk characteristics, which requires to change the recording pulse condition individually, are both present. Therefore, in such cases where the difference in laser characteristics and the difference in disk characteristics are both present as described above, one problem is that the recording condition cannot be set efficiently, and long time is required to set the recording condition.

Moreover, according to Patent Publication 1, only a condition on pulse width is optimized, and a condition on laser power is not optimized, in setting the recording pulse condition. Like the pulse width, the laser power influences the quality of reproduction signals. Therefore, by also optimizing the condition on laser power, the quality of reproduction signals can be improved more efficiently. In this respect, Publication 1 has a room for further improvement.

According to the method of Patent Publication 2, testwrite is performed by using all combinations of recording power and pulse width, without even handling the difference in laser characteristics and the difference in disk characteristics separately. Therefore, enormous process time is required in order to determine the recording power and pulse width, and recording zone for the testwrite is required. According to another method disclosed in Patent Publication 2, optimal recording power is determined through testwrite, and then testwrite is performed by using a plurality of pulse widths. In accordance with the result of the testwrite, both the recording power and the pulse width are determined. However, since the test write is performed by using conditions of all pulse widths, this method also has the problem that enormous process time is required in order to determine the recording power and pulse width, and recording zone for the testwrite is required. Moreover, since conditions on mark length or on a combination of mark length and space length are not considered, this method has a problem that, even if there are differences in characteristics on the apparatus side and on the disk side, the differences cannot be dealt with.

SUMMARY OF THE INVENTION

The present invention was made to solve the foregoing conventional problems. Am object of the present invention is therefore to provide method and apparatus for efficiently setting such a recording condition that can reduce the influence of difference in characteristics of writable optical disks and difference in characteristics of optical recording and reproducing apparatuses, and to provide a recording and reproducing apparatus, a recording condition setting program, and a recording medium.

To attain the foregoing object, a first recording condition setting method of the present invention is a recording condition setting method for setting a recording condition in a recording method for forming recorded marks by radiating light beam in accordance with a recording pulse condition that includes a plurality of elements and identifies rise and fall positions of a plurality of pulse rows for forming the recorded marks, the recording pulse condition being set with respect to each mark length or each combination of mark length and space length, the recording condition setting method including: a first search step in which a recording pulse condition for obtaining a reproduction result which fulfills predetermined signal quality is sought by performing testwrite and reproduction after uniformly changing predetermined recording pulse conditions corresponding to all mark lengths or all combinations; a second search step in which, if a reproduction result which fulfills predetermined signal quality is not obtained in the first search step, a recording pulse condition for obtaining a reproduction result which fulfills predetermined signal quality is sought by performing testwrite and reproduction after changing a predetermined recording pulse condition corresponding to at least one mark length or at least one combination; and a recording condition setting step, in which a recording pulse condition is determined in accordance with a search result of the second search step if the second search step is performed, or in accordance with a search result of the first search step if the second search step is not performed.

According to this arrangement, first, a recording pulse condition for obtaining a reproduction result which fulfills predetermined signal quality is sought by performing testwrite and reproduction after uniformly changing predetermined recording pulse conditions corresponding to all mark lengths or all combinations (first search step). That is, the difference in characteristics on the apparatus side, which is likely to occur and has an influence on all mark lengths or all combinations, is dealt with by searching an optimal recording pulse condition.

If a reproduction result which fulfills predetermined signal quality is not obtained in the first search step, a recording pulse condition for obtaining a reproduction result which fulfills predetermined signal quality is sought by performing testwrite and reproduction after changing a predetermined recording pulse condition corresponding to at least one mark length or at least one combination (second search step).

The difference in characteristics on the disk side is less likely to occur than the difference in characteristics on the apparatus side. Moreover, since the recording pulse condition(s) needs to be changed with respect to each mark length or combination, it requires a long time. Therefore, by adopting the foregoing order in searching a recording pulse condition for obtaining a reproduction result which fulfills predetermined signal quality, it is possible to set the optimal recording condition (correct the recording condition) efficiently, even if the there are differences in characteristics on both the apparatus side and the disk side.

A second recording condition setting method of the present invention is a recording condition setting method for setting a recording condition in a recording method for forming recorded marks by radiating light beam in accordance with a recording pulse condition that includes a plurality of elements and identifies rise and fall positions of a plurality of pulse rows for forming the recorded marks, the recording pulse condition being set with respect to each mark length or each combination of mark length and space length, the recording condition setting method including: a first search step in which a recording pulse condition for obtaining a reproduction result which fulfills predetermined signal quality is sought by performing testwrite and reproduction after changing predetermined recording conditions corresponding to not less than half of all mark lengths or not less than half of all combinations of mark length and space length; a second search step in which, if a reproduction result which fulfills predetermined signal quality is not obtained in the first search step, a recording pulse condition for obtaining a reproduction result which fulfills predetermined signal quality is sought by performing testwrite and reproduction after changing a predetermined recording pulse condition corresponding to at least one mark length or at least one combination; and a recording condition setting step, in which a recording pulse condition is determined in accordance with a search result of the second search step if the second search step is performed, or in accordance with a search result of the first search step if the second search step is not performed.

In the first recording condition setting method, testwrite and reproduction are performed after uniformly changing predetermined recording pulse conditions corresponding to all mark lengths or all combinations, in the first search step for dealing with the difference in characteristics on the apparatus side by searching an optimal recording pulse condition. However, even if predetermined recording pulse conditions corresponding to all mark length or all conditions are not changed, and even if predetermined recording pulse conditions are not uniformly, it is possible to attain an effect of reducing, not less than by half, the influence of the recording pulse conditions caused primarily due to the difference in laser characteristics, and thereby improving the signal quality. To attain this effect, in the first search step of the second recording condition setting method, testwrite and reproduction are performed after changing predetermined recording pulse conditions corresponding to not less than half of all mark lengths or not less than half of all combinations of mark length and space length.

A third recording condition setting method of the present invention is a recording condition setting method for setting a recording condition in a recording method for forming recorded marks by radiating light beam in accordance with a recording pulse condition that includes a plurality of elements and identifies rise and fall positions of a plurality of pulse rows for forming the recorded marks, the recording condition setting method including: a first search step in which a recording pulse condition for obtaining a reproduction result which fulfills predetermined signal quality is sought by performing testwrite and reproduction after changing a pulse rise characteristic and/or a pulse fall characteristic of the light beam; a second search step in which, if a reproduction result which fulfills predetermined signal quality is not obtained in the first search step, a recording pulse condition for obtaining a reproduction result which fulfills predetermined signal quality is sought by performing testwrite and reproduction after changing at least one recording pulse condition; and a recording condition setting step, in which a recording pulse condition is determined in accordance with a search result of the second search step if the second search step is performed, or in accordance with a search result of the first search step if the second search step is not performed.

In the first recording condition setting method, testwrite and reproduction are performed after uniformly changing predetermined recording pulse conditions corresponding to all mark lengths or all combinations, in the first search step for dealing with the difference in characteristics on the apparatus side by searching an optimal recording pulse condition. However, instead of changing setting values of the recording pulse conditions, such as the pulse widths, a rise characteristic of a laser and/or a fall characteristic of a laser may be changed in the laser drive circuit or the like. Since this arrangement also changes the resultant recording pulse, it is possible to attain the effect of reducing the influence of the recording pulse conditions caused primarily due to the difference in laser characteristics, and thereby improving the signal quality. To attain this effect, in the first search step of the third recording condition setting method, testwrite and reproduction are performed after changing a pulse rise characteristic and/or a pulse fall characteristic of the light beam.

In these arrangements, it is preferable that, in the second search step, a recording pulse condition set in accordance with the search result of the first search step is used. It is more preferable that, in the second search step, a recording pulse condition that is closest to fulfilling the predetermined signal quality in the first search step is used, or, in the second search step, a recording pulse condition set in accordance with a range of a recording pulse condition that fulfills the predetermined signal quality in the first search step is used.

According to these arrangements, it is possible to obtain a good reproduction result (reproduction result which fulfills predetermined signal quality) efficiently in the second search step, and thereby shorten the time required for setting a recording condition.

In the foregoing arrangement, it is preferable that, in the first and/or the second search step, a recording power condition for obtaining a good reproduction result is sought by changing, before the testwrite, a recording power condition that defines power of the light beam.

According to this arrangement, it is possible to correct not only the recording pulse conditions, but also the recording power condition, which changes the mark width of the recorded mark. Therefore, it is possible to further improve the quality of the reproduction signal.

A first recording condition setting apparatus of the present invention is a recording condition setting apparatus for setting a recording condition in a recording and reproducing apparatus for forming the recorded marks by radiating light beam in accordance with a recording pulse condition that identifies rise and fall positions of a plurality of pulse rows for forming the recorded marks, the recording pulse condition being set with respect to each mark length or each combination of mark length and space length, the recording condition setting apparatus including: first search means for searching a recording pulse condition for obtaining a reproduction result which fulfills predetermined signal quality, by performing testwrite and reproduction after uniformly changing predetermined recording pulse conditions corresponding to all mark lengths or all combinations; second search means for searching a recording pulse condition for obtaining a reproduction result which fulfills predetermined signal quality, by performing testwrite and reproduction after changing a predetermined recording pulse condition corresponding to at least one mark length or at least one combination; and recording condition determining means for determining a recording pulse condition in accordance with a search result of the second search means if search by the second search means is performed, or in accordance with a search result of the first search means if the search by the second search means is not performed, the recording condition determining means causing the first search means to perform search first, and causing the second search means to perform search if a reproduction result which fulfills predetermined signal quality is not obtained by the first search means.

As described in connection with the first recording condition setting method of the present invention, by adopting the foregoing order in searching a recording pulse condition for obtaining a reproduction result which fulfills predetermined signal quality, it is possible to set the optimal recording condition (correct the recording condition) efficiently, even if the there are differences in characteristics on both the apparatus side and the disk side.

A second recording condition setting apparatus of the present invention is a recording condition setting apparatus for setting a recording condition in a recording and reproducing apparatus for forming the recorded marks by radiating light beam in accordance with a recording pulse condition that identifies rise and fall positions of a plurality of pulse rows for forming the recorded marks, the recording pulse condition being set with respect to each mark length or each combination of mark length and space length, the recording condition setting apparatus including: first search means for searching a recording pulse condition for obtaining a reproduction result which fulfills predetermined signal quality, by performing testwrite and reproduction after changing predetermined recording conditions corresponding to not less than half of all mark lengths or not less than half of all combinations of mark length and space length; second search means for searching a recording pulse condition for obtaining a reproduction result which fulfills predetermined signal quality, by performing testwrite and reproduction after changing a predetermined recording pulse condition corresponding to at least one mark length or at least one combination; and recording condition determining means for determining a recording pulse condition in accordance with a search result of the second search means if search by the second search means is performed, or in accordance with a search result of the first search means if the search by the second search means is not performed, the recording condition determining means causing the first search means to perform search first, and causing the second search means to perform search if a reproduction result which fulfills predetermined signal quality is not obtained by the first search means.

As described in connection with the second recording condition setting method of the present invention, by adopting the foregoing order in searching a recording pulse condition for obtaining a reproduction result which fulfills predetermined signal quality, it is possible to set the optimal recording condition (correct the recording condition) efficiently, even if the there are differences in characteristics on both the apparatus side and the disk side.

A third recording condition setting apparatus of the present invention is a recording condition setting apparatus for setting a recording condition in a recording and reproducing apparatus for forming the recorded marks by radiating light beam in accordance with a recording pulse condition that identifies rise and fall positions of a plurality of pulse rows for forming the recorded marks, the recording pulse condition being set with respect to each mark length or each combination of mark length and space length, the recording condition setting apparatus including: first search means for searching a recording pulse condition for obtaining a reproduction result which fulfills predetermined signal quality, by performing testwrite and reproduction after changing a pulse rise characteristic and/or a pulse fall characteristic of the light beam; second search means for searching a recording pulse condition for obtaining a reproduction result which fulfills predetermined signal quality, by performing testwrite and reproduction after changing at least one recording pulse condition; and recording condition determining means for determining a recording pulse condition in accordance with a search result of the second search means if search by the second search means is performed, or in accordance with a search result of the first search means if the search by the second search means is not performed, the recording condition determining means causing the first search means to perform search first, and, if a reproduction result which fulfills predetermined signal quality is not obtained by the first search means, setting a recording pulse condition in accordance with the search result of the first search means and causing the second search means to perform search in accordance with the recording pulse condition set by the first search means.

As described in connection with the third recording condition setting method of the present invention, by adopting the foregoing order in searching a recording pulse condition for obtaining a reproduction result which fulfills predetermined signal quality, it is possible to set the optimal recording condition (correct the recording condition) efficiently, even if the there are differences in characteristics on both the apparatus side and the disk side.

In the foregoing arrangements, it is preferable that, in the second search means, a recording pulse condition set in accordance with the search result of the first search means is used. It is more preferable that, in the second search means, a recording pulse condition that is closest to fulfilling the predetermined signal quality in the first search means is used, or, in the second search means, a recording pulse condition set in accordance with a range of a recording pulse condition that fulfills the predetermined signal quality in the first search means is used.

According to these arrangements, it is possible to obtain a good reproduction result (reproduction result which fulfills predetermined signal quality) efficiently through search performed by the second search means, and thereby shorten the time required for setting a recording condition.

In the foregoing arrangement, the first and/or the second search means may search a recording power condition for obtaining a good reproduction result by changing, before the testwrite, a recording power condition that defines power of the light beam.

According to this arrangement, it is possible to correct not only the recording pulse conditions, but also the recording power condition, which changes the mark width of the recorded mark. Therefore, it is possible to further improve the quality of the reproduction signal.

In the foregoing arrangement, in changing a recording pulse condition, the first and/or the second search means may change an element of the recording pulse condition that changes a mark width of a recorded mark.

By changing an element of the recording pulse condition that changes a mark width of a recorded mark, it is possible to attain an effect of optimizing a mark width of a recorded mark, as in the case where a recording power condition is changed.

In the foregoing arrangement, in changing a recording pulse condition, the first and/or the second search means may increase a pulse width before decreasing the pulse width.

In changing a pulse width, by increase a pulse width before decreasing the pulse width, it is possible to obtain a good error rate with high probability. Therefore, it is possible to set an optimal recording condition more efficiently.

In the foregoing arrangement, in changing a recording pulse condition, the first and/or the second search means may change an element of the recording pulse condition that changes a position of a front edge of a recorded mark.

If an element of the recording pulse condition that changes a position of a front edge of a recorded mark is changed, the position of the leading part of the recording mark moves forward or backward. As a result, there is an effect that the mark length of the recorded mark and the space length of the preceding space can be optimized.

In the foregoing arrangement, in changing a recording pulse condition, the first and/or the second search means may change an element of the recording pulse condition that changes a position of a back edge of a recorded mark.

If an element of the recording pulse condition that changes a position of a back edge of a recorded mark is changed, the position of the end part of the recording mark moves forward or backward. As a result, there is an effect that the mark length of the recorded mark and the space length of the following space can be optimized.

In the foregoing arrangement, in changing a recording pulse condition, the first and/or the second search means may change an element of the recording pulse condition that changes a position of a back edge of a recorded mark before changing an element of the recording pulse condition that changes a position of a front edge of the recorded mark.

By thus performing testwrite after changing, firstly, an element of the recording pulse condition that changes a position of a back edge of a recorded mark, the element being independent from the other elements of the recording mark condition, it is possible to set an optimal condition efficiently.

In the foregoing arrangement, the predetermined recording pulse conditions and/or the predetermined recording power condition may be recorded in a recording medium, and read out of the recording medium and used by the first and/or the second search means.

A recording and reproducing apparatus of the present invention includes the recording condition setting apparatus of the present invention.

With this arrangement, it is possible to provide a recording and reproducing apparatus capable of setting the optimal recording condition (correct the recording condition) efficiently, even if the there are differences in characteristics on both the apparatus side and the disk side.

The recording condition setting apparatus may be realized by a computer. In this case, the present invention includes a recording condition setting program for realizing the recording condition setting apparatus by a computer by causing the computer to function as each means of the recording condition setting apparatus, and a computer-readable recording medium in which a recording condition setting program is recorded.

According to the present invention, first, the difference in characteristics on the apparatus side, which is likely to occur and has an influence on all mark lengths or all combinations, is dealt with by searching an optimal recording pulse condition. If a good reproduction result (reproduction result which fulfills predetermined signal quality) is not obtained, a recording pulse condition for obtaining a reproduction result which fulfills predetermined signal quality is sought by performing testwrite and reproduction after changing a predetermined recording pulse condition corresponding to at least one mark length or at least one combination. Therefore, it is possible to set the optimal recording condition (correct the recording condition) efficiently, even if the there are differences in characteristics on both the apparatus side and the disk side.

For a fuller understanding of the nature and advantages of the invention, reference should be made to the ensuing detailed description taken in conjunction with the accompanying drawings.

DESCRIPTION OF THE EMBODIMENTS

With reference to FIGS. 1 to 21, the following describes embodiments of the present invention.

Figure 2:
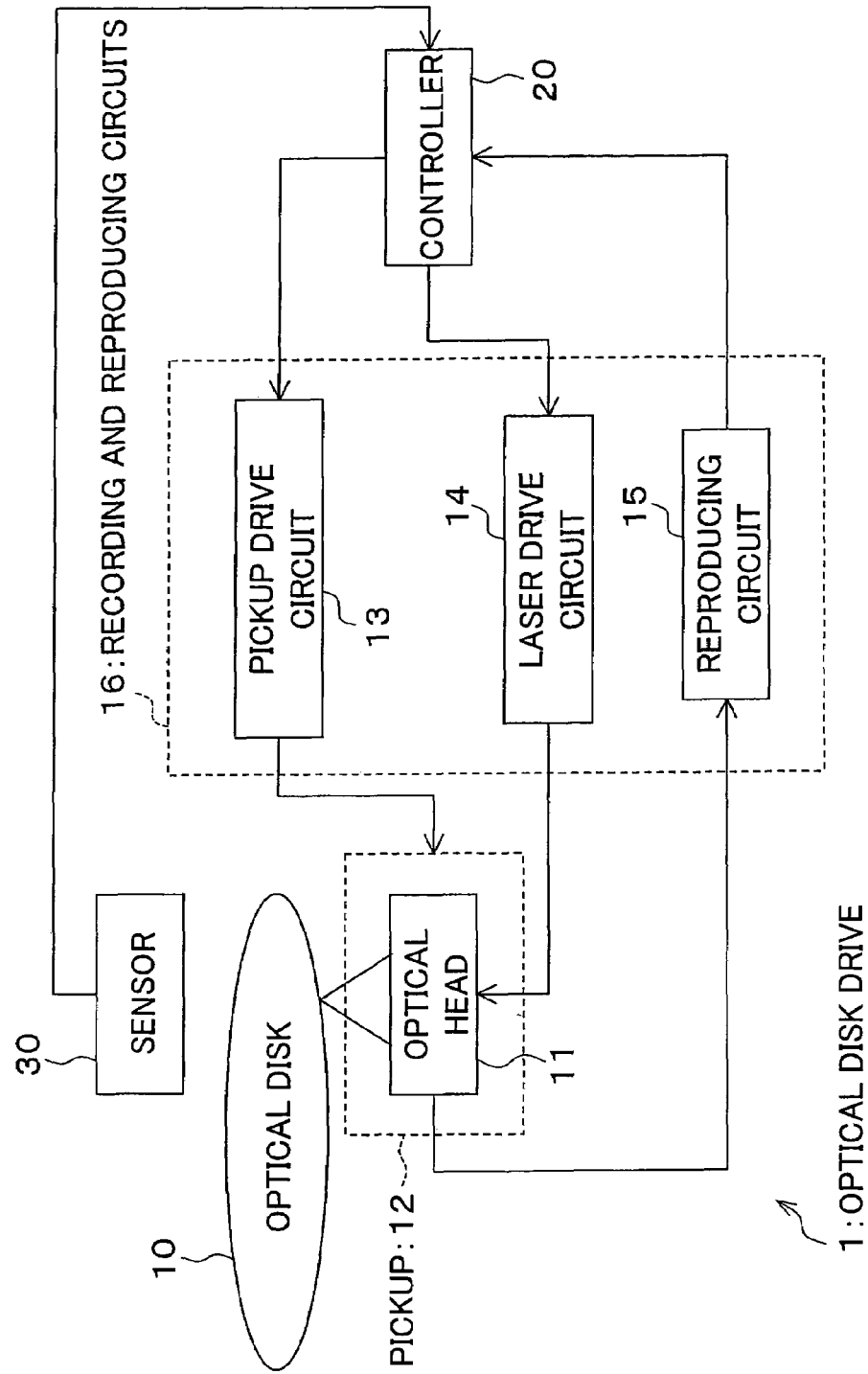
FIG. 2 is a block diagram illustrating an arrangement of the optical disk drive.

As shown in FIG. 2, an optical disk drive (recording and reproducing apparatus) 1 of the present embodiment includes an optical disk 10, an optical head 11, a pickup 12, a pickup drive circuit 13, a laser drive circuit 14, a reproducing circuit 15, a sensor 30, and a controller 20. The optical head 11 is provided to the pickup 12.

In the optical disk drive 1, at the time of recording, the controller 20 controls the pickup 12 through the pickup drive circuit 13 so that the controller 20 moves to a track (not shown) on the optical disk (recording medium) 10, which is rotating. Then, the controller 20 sets a recording condition through the laser drive circuit 14, and the optical head 11 emits a recording laser beam onto a recording portion of the optical disk 10. In this way, data is recorded into the track of the optical disk 10.

At the time of reproduction, the controller 20 controls the pickup 12 through the pickup drive circuit 13 so that the pickup 12 moves to the recording portion of the optical disk 10. Then, the controller 20 controls the optical head 11 through the laser drive circuit 14 so that the optical head 11 emits a reproduction laser beam onto the optical disk 10. The reflected light from the optical disk 10 is detected by the optical head 11. The reflected light is then converted into a reproduction signal, and inputted to the controller 20. In this way, the data recorded in the track of the optical disk 10 is reproduced.

The sensor 30 detects insertion of the optical disk 10 into the optical disk drive 1, and/or change of recording environment for the optical disk 10. The sensor 30 includes, for example, a temperature sensor for detecting a temperature at the recording portion of the optical disk 10. The sensor 30 outputs the result of detection as a detected signal to the controller 20.

In addition to the functions above, the controller 20 has a function of starting up, when appropriate, operation for setting the recording condition. The controller 20 starts up the operation for setting the recording condition not only when the optical disk 10 is inserted into the optical disk drive 1, but also while information is recorded (e.g. when a predetermined change of recording environment is detected in the detected signal from the sensor 30, and when predetermined time has elapsed after the previous testwrite). Thus, the controller 20 is a recording condition setting apparatus, recording condition determining means, and first and second search means.

Figure 3:
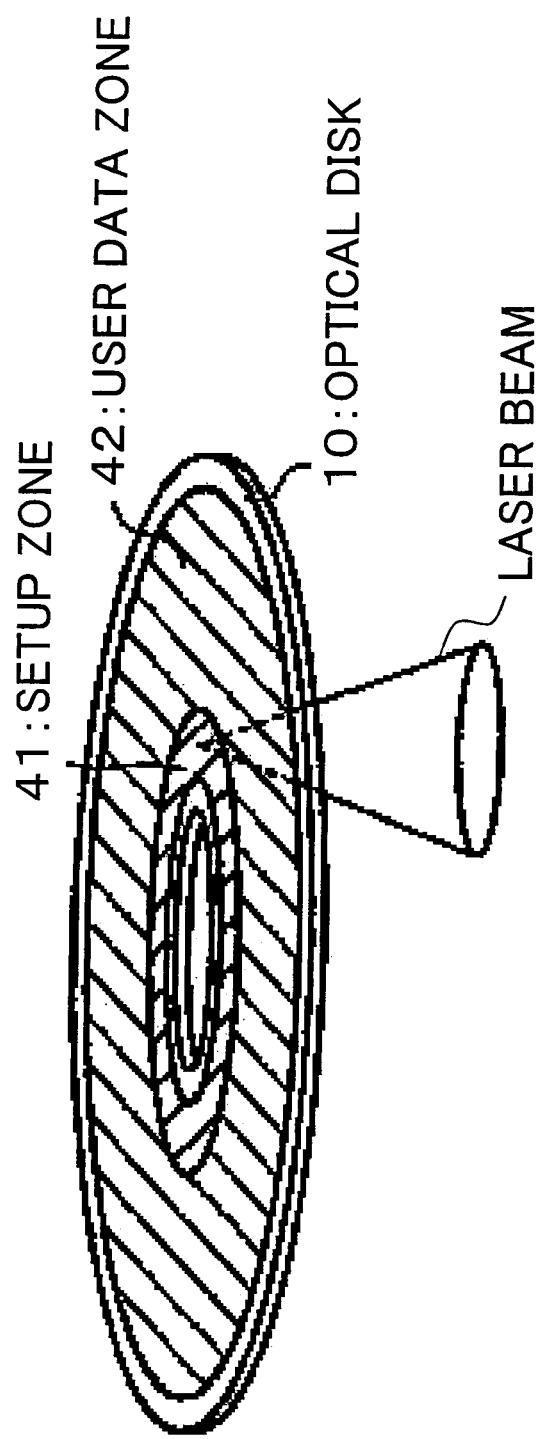
FIG. 3 is a perspective view illustrating an optical disk into which information is recorded by the optical disk drive.

As shown in FIG. 3, the optical disk drive 1 sets the recording condition in accordance with testwrite performed on a setup zone 41 of the optical disk 10. Under the recording condition, data is recorded into each track. After the recording condition of the optical disk drive 1 is set, recording operation is performed on a user data zone 42 in the same manner as a generally known operation. In the setup zone 41, a standard recording condition including standard recording power parameters and standard recording pulse parameters is recorded in advance.

In the optical disk drive 1, the standard recording condition is read out of the setup zone 41 of the optical disk 10. This standard recording condition is used in setting the recording condition. The standard recording setting may be then stored in a memory (memory means; not shown) provided in the controller 20, and may be read out and used. The position of the setup zone 41 is not limited to the position shown in FIG. 3. The setup zone 41 may be at any radius position on the optical disk 10. The setup zone 41 may be plural in number.

Next, a recording condition setting method employed by the optical disk drive 1 is described, with reference to FIGS. 4 to 10.

The following discusses an example where (1, 7) RLL (Run Length Limited code) is used as a modulation method. However, the modulation method used in the present invention is not limited to (1, 7) RLL.

(1, 7) RLL code is a code used in magnetic or optical digital recording, and the code is subjected to limitation on minimum value and maximum value of inversion interval. In the (1, 7) RLL modulation method, a pulse row of a recording pulse for forming a recorded mark includes a leading part and an end part, in the case of a shortest recorded mark (details are described later). In the case of a recorded mark longer than the shortest recorded mark, a middle part whose length depends on the mark length is provided between the leading part and the end part.

In another modulation method, the shortest mark length starts from 3T. In this case, the shortest recorded mark includes a leading part, a middle part, and an end part (for example, in the case of DVD-RW). In yet another method, the shortest mark length is 2T, but the shortest mark length includes a leading part alone (for example, in the case of DVD-R).

Figure 4:
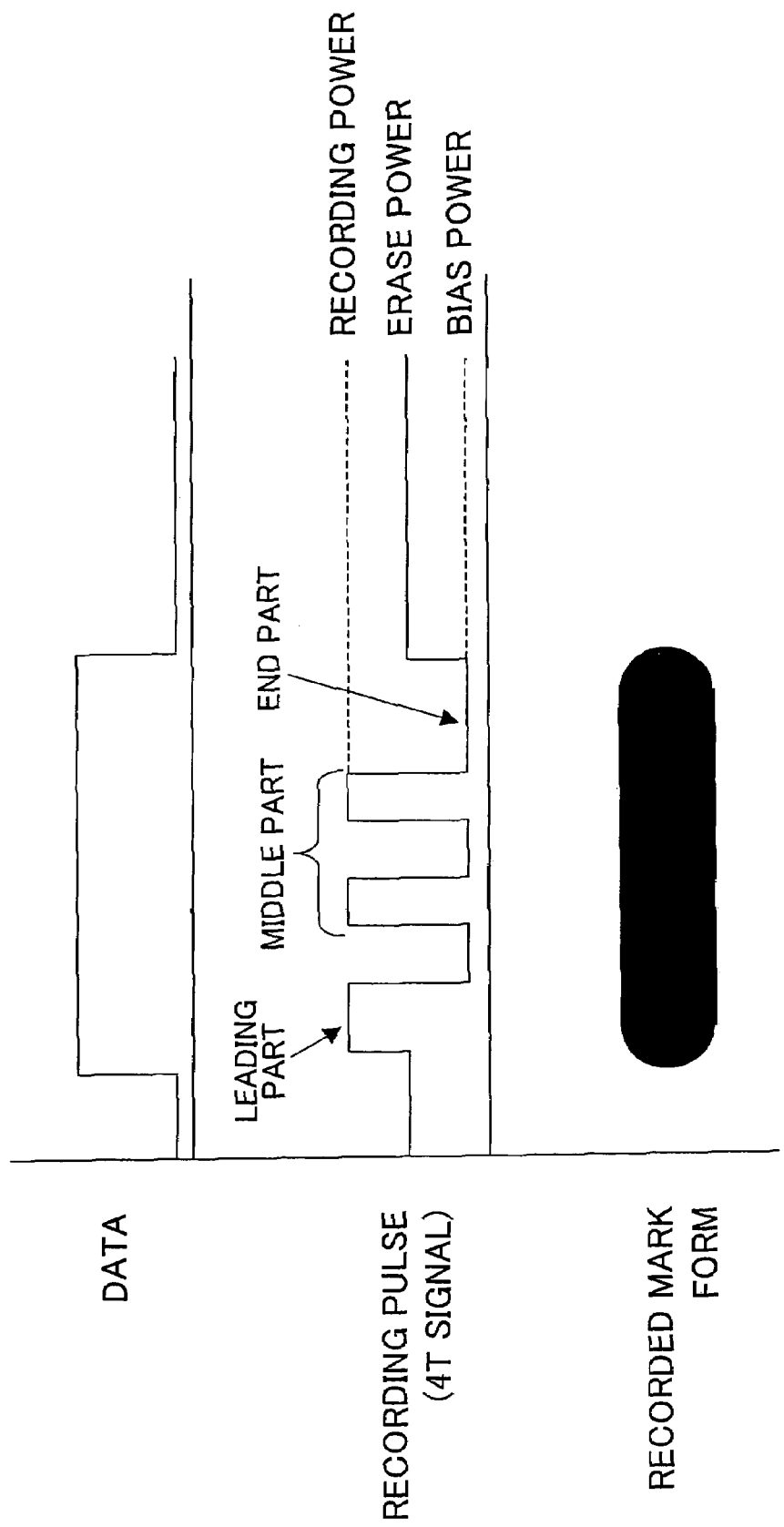
FIG. 4 is a timing chart illustrating a setting of a pulse row corresponding to data.

FIG. 4 illustrates data, a pulse row corresponding thereto, and the shape of a recorded mark formed. In setting the pulse row of the recording pulse corresponding to the data, the temperature distribution of the optical disk 10 that allows for recording into the optical disk 10 is considered. The pulse row of FIG. 4 is a pulse row corresponding to a 4T mark. As described above, the pulse row includes a leading part, an end part, and a middle part (the middle part is provided to a pulse row not shorter than a 3T mark). Here, "T" means the time of one clock period. Therefore, a 4T mark is a mark (recording zone) in which "1" is recorded in the time of four clock periods.

As shown in FIG. 4, the pulse row also includes elements respectively indicating power levels of recoding power, erase power, and bias power. In the description below, the recoding power, erase power, and bias power are collectively referred to as recording power parameters, and a condition including these recording power parameters is referred to as recording power condition. In FIG. 4, the recording power of the pulse is the same at the leading part and at the middle part. However, the recording power may be different from pulse to pulse (at the leading part and at the middle part).

Figure 5:
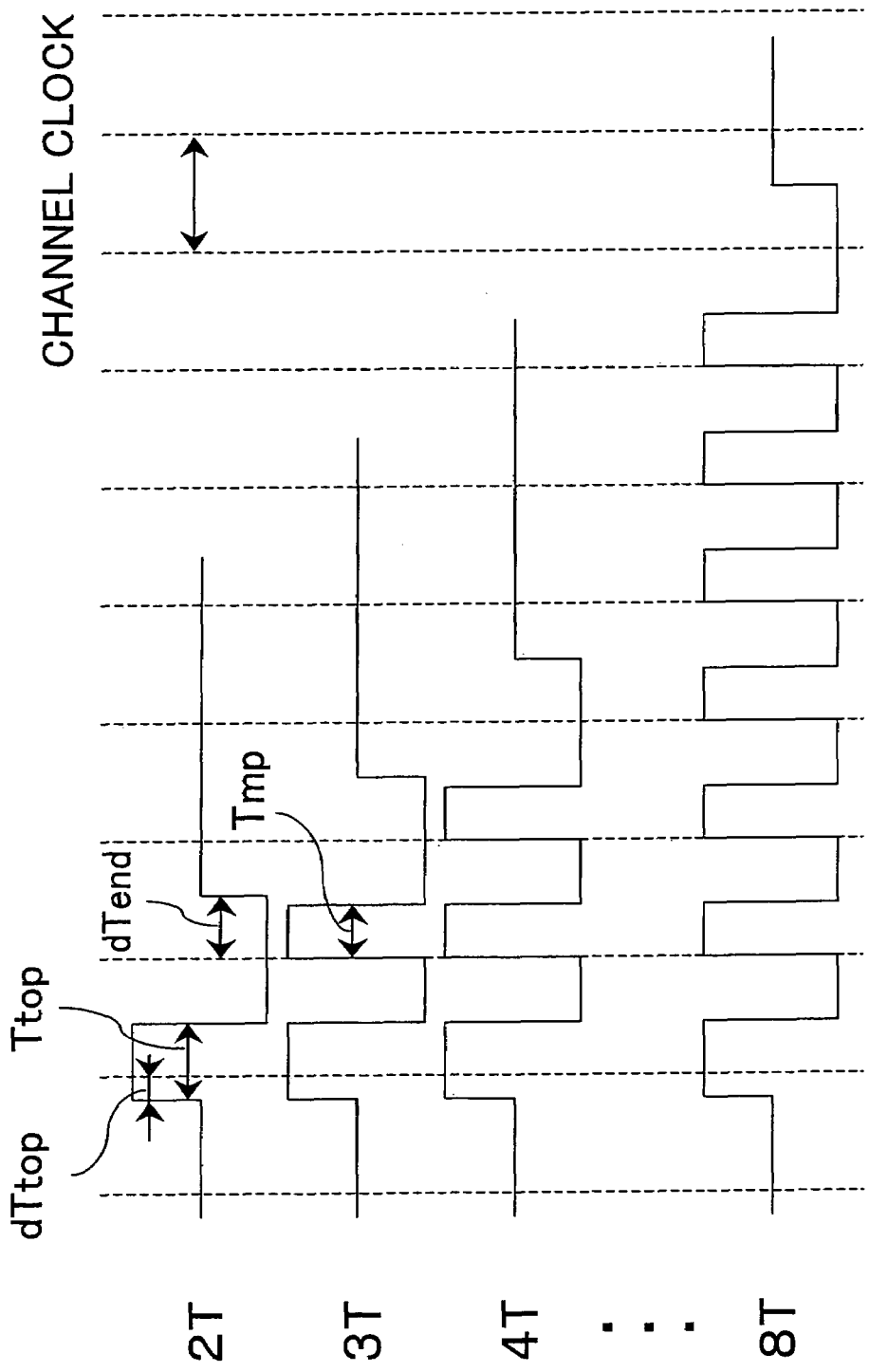
FIG. 5 is a timing chart illustrating pulse rows respectively for forming 2T mark to 8T mark, and various pulse parameters that constitute a recording pulse condition.

FIG. 5 illustrates pulse rows respectively for forming a 2T mark to an 8T mark, and recording pulse conditions respectively for realizing the pulse rows. Each recording pulse condition includes a combination of plural kinds of elements, such as a leading part pulse start position dTtop, a leading part pulse width Ttop, an end pulse end position dTend, and a middle part pulse width Tmp. These elements are collectively referred to as recording pulse parameters. The leading part pulse start position dTtop indicates a start position of the pulse at the leading part (an element that changes a front edge of the recorded mark); the leading part pulse width Ttop indicates a pulse width of the leading part; the end pulse end position dTend indicates an end position of the pulse at the end part (an element that changes a back edge of the recorded mark); and the middle part pulse width Tmp indicates a pulse width of the middle part. When these values change, the shape of the recorded mark changes. Standard values of the recording pulse conditions and the recording power condition is recorded in advance as standard recording conditions in the setup zone 41.

These recording pulse conditions are set in accordance with mark lengths, and the settings are independent from each other. The pulse row of the shortest recorded mark length includes the leading part and the end part, and the recording pulse parameters constituting the recording pulse condition of the pulse row are the leading part pulse start position dTtop, the leading part pulse width Ttop, and the end part pulse end position dTend. These recording pulse parameters are not used in setting the leading part and end part of another mark length. For example, these recording pulse parameters are different from the leading part pulse start position dTtop, the leading part pulse width Ttop, and the end part pulse end position dTend constituting the recording pulse condition for a 3T mark. The recording pulse parameters constituting the recording pulse condition for a 3T mark is set separately.

The relationship between (i) recording pulse parameters constituting a recording pulse condition and (ii) a recorded mark formed is as follows. If the value of the leading part pulse start position dTtop increases, the leading position of the recorded mark moves forward. If it decreases, on the other hand, the leading position of the recorded mark moves backward. If the value of the leading part pulse width Ttop increases, the width of the front part of the recorded mark (the size of the recorded mark in the direction perpendicular to the direction of perimeter of a track) increases. If it decreases, on the other hand, the width of the front part of the recorded mark decreases. If the value of the end part pulse end position dTend increases, the end position of the recorded mark moves backward. If it decreases, on the other hand, the end position of the recorded mark moves forward. If the middle part pulse width Tmp increases, the width of the recorded mark increases. If it decreases, on the other hand, the width of the recorded mark decreases.

The width of the recorded mark (hereinafter "mark width") changes also in accordance with a change of a recording power parameter. In that sense, the leading part pulse width Ttop and the middle part pulse width Tmp are recording pulse parameters that influence the recording power parameter.

The difference in laser characteristics, which is a difference in characteristics on the apparatus side, is attributed primarily to the fact that light emitted from each apparatus is not always the same, even if current of the same waveform is supplied to the laser of each apparatus. Specifically, since the time for the rise and fall of a light emission pulse is different from apparatus to apparatus, an outputted waveform is different from a setting waveform.

Figure 6:
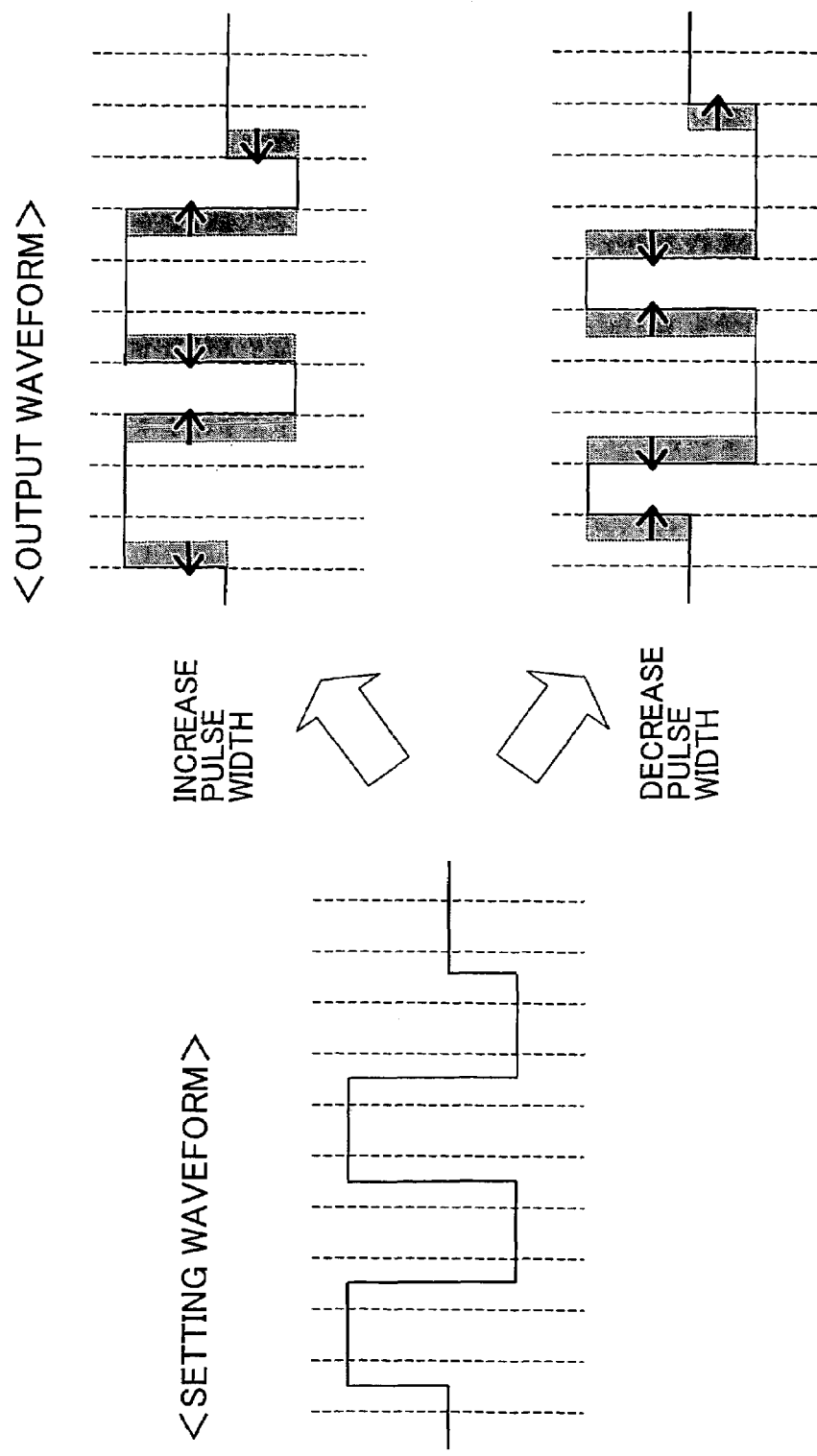
FIG. 6 is a waveform chart illustrating an example of a setting waveform and output waveforms changed by an influence of a difference in laser characteristics.

FIG. 6 illustrates an example of the output waveform that is different from the setting waveform due to the difference in laser characteristics. If the time for the rise of the pulse comes early and the time for the fall of the pulse comes late, the pulse width increases from the pulse width of the setting waveform. On the other hand, if the time for the rise of the pulse comes late and the time for the fall of the pulse comes early, the pulse width decreases from the setting waveform. These differences are caused in the recorded marks of any mark length. Therefore, correction is made by uniformly changing the recording pulse conditions for all wave lengths by a predetermined amount.

Figure 10:
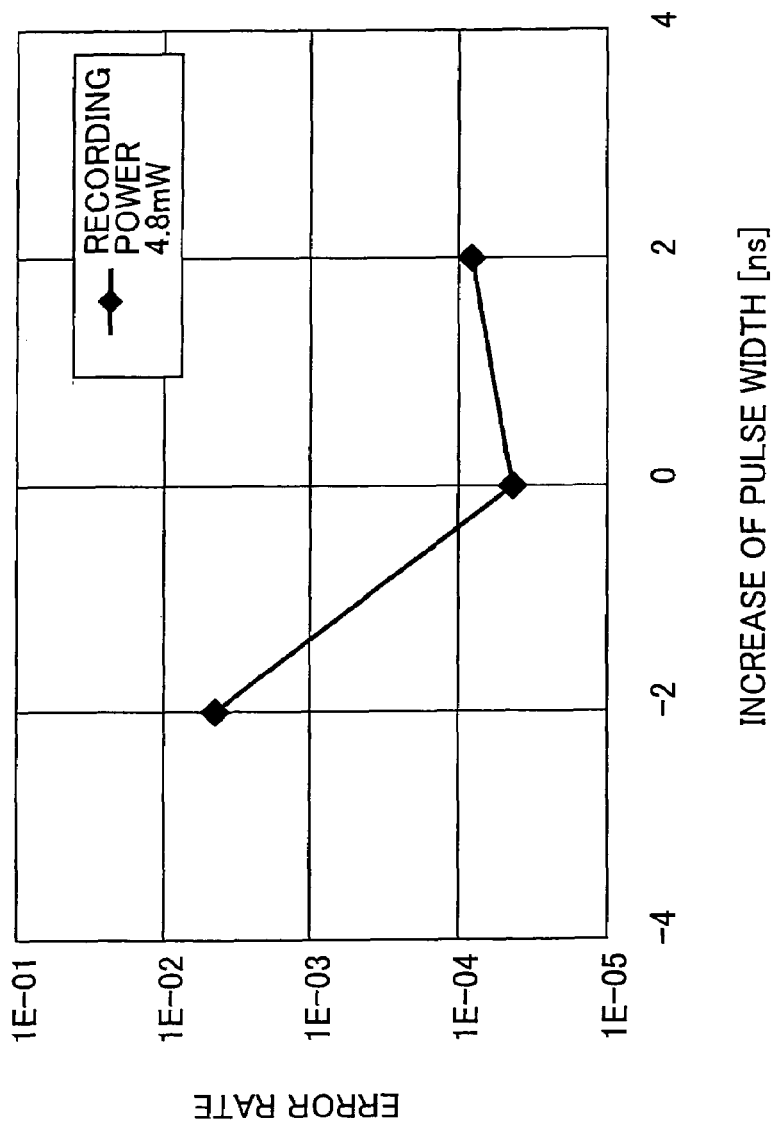
FIG. 10 is a graph showing how a difference in recording pulse influences recording/reproduction performance.

FIG. 10 illustrates how an error rate changes when 2 ns is uniformly added to or subtracted from the leading part pulse width Ttop and the middle part pulse width Tmp, which are two recording pulse parameters of a predetermined recording pulse condition (standard recording condition) for a disk. From FIG. 10, it is found that the error rate deteriorates when the pulse width increases or decreases.

This means that, if short pulse widths are set, the error rate can be improved by making a uniform correction so that the pulse widths increase, and, if long pulse widths are set, the error rate can be improved by making a uniform correction so that the pulse width decrease. However, since it is difficult to detect whether or not the pulse widths are outputted exactly as they are set, the pulse widths are corrected by performing testwrite after increasing or decreasing the pulse widths uniformly, and detecting the change of the error rate.

If such disks that are manufactured under sufficient quality control and therefore have little difference in characteristics are used, no significant problem will arise, as long as the standard recording conditions recorded in the disks in advance are adopted, and the difference in pulse widths among apparatuses is corrected as described above. However, if the standard recording conditions have a large gap with disk performance, the disks cannot demonstrate their characteristics even if the standard recording conditions are read out of the disks and reproduced with high fidelity.

In the case of such difference in characteristics on the disk side, it is unknown which recording pulse condition, among the recording pulse conditions respectively set for the mark lengths, is different. Therefore, correction is performed individually by performing after changing a recording pulse condition corresponding to at least one mark length among all mark lengths, and detecting the error rate. In this specification, to change a recording pulse condition means to change at least one of a plurality of recording pulse parameters constituting the recording pulse condition.

The order of performing the two corrections is important. In the case of the optical disk drive 1 of the present embodiment, the recording pulse conditions corresponding to all mark lengths are changed uniformly, and testwrite is performed. Then, testwrite pattern is reproduced, and it is judged whether or not a good result is obtained. If a good result is obtained, correction is performed by using that value. If a good result is not obtained, then the recording pulse conditions are changed individually (with respect to each mark length), and testwrite is performed. After reproduction is performed, and it is judged whether or not a good result is obtained, then correction is performed.

This is because (i) the time for the rise and fall of the laser pulse can be different from apparatus to apparatus, and (ii) it is more efficient to improve the error rate by uniformly changing the recording pulse conditions corresponding to all mark lengths, than by individually changing the recording pulse condition for each mark length when it is unknown whether or not the recording pulse condition for each mark length is different.

If the standard recording conditions are not recorded in the disks in advance, the characteristics of the disks are unknown. In the case of such disks, standard recording conditions are set on the apparatus side (these are used as predetermined recording conditions) in the beginning. Then, as described above, the recording conditions are corrected by uniformly changing the pulse widths, changing the recording pulse parameters individually, performing testwrite, and detecting the error rate.

Next, specific operations for setting the recording condition for the optical disk drive 1 are described, with reference to the flowcharts of FIG. 1 and FIGS. 7 to 9.

Figure 1:
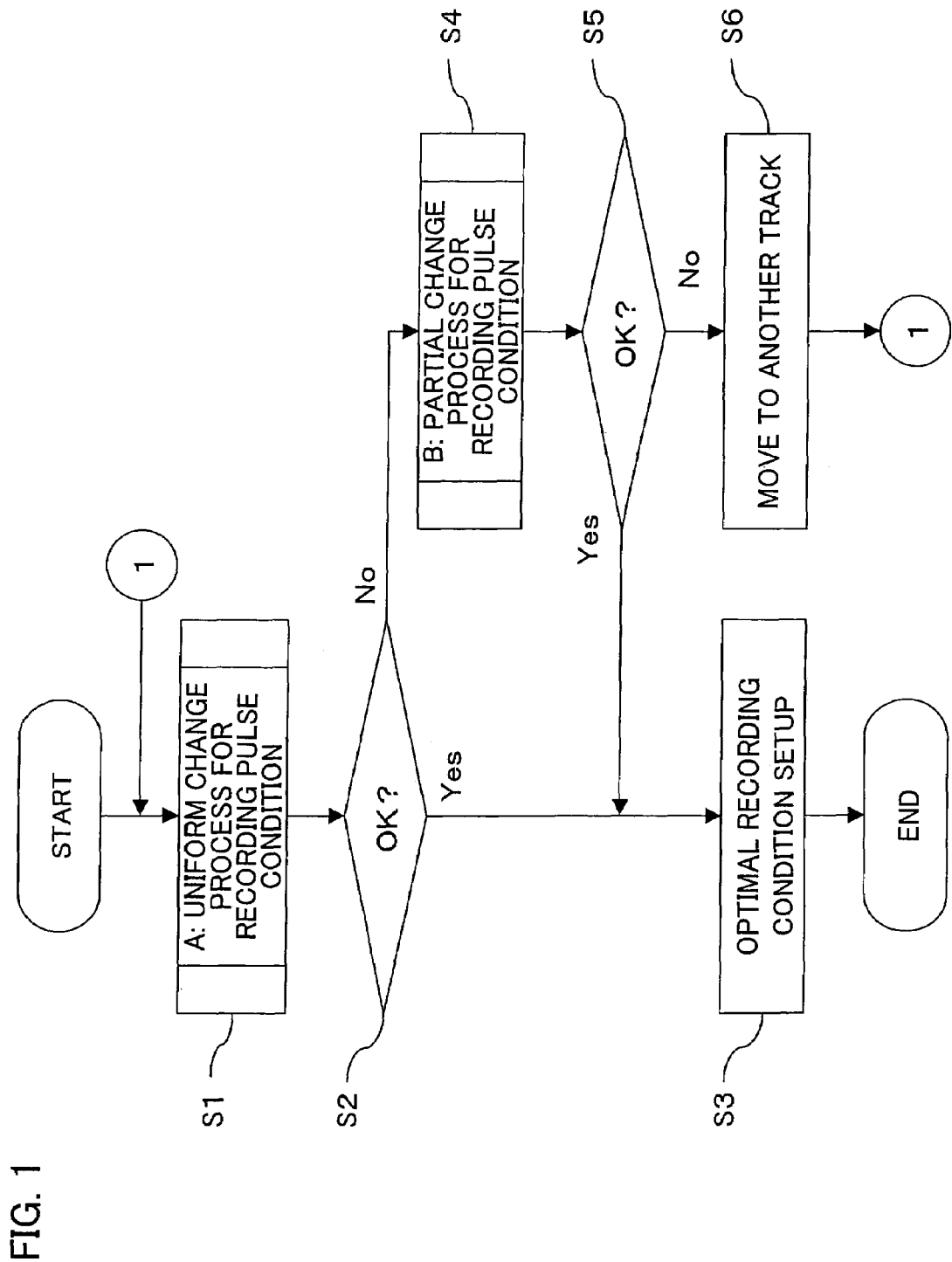
FIG. 1 is a flowchart illustrating recording condition setting process performed by an optical disk drive in accordance with one embodiment of the present invention.

First, the entire operation for setting the recording conditions is described, with reference to the flowchart of FIG. 1. First, the optical disk drive 1 performs uniform change process for recording pulse condition (first search step; hereinafter "A-process"), which is described later, in accordance with the control of the controller 20 (S1). Then, the optical disk drive 1 judges whether or not the result of the A-process is OK (S2). If OK is returned, it means that optimal recording conditions are obtained. Therefore, the recording conditions are set as optimal recording conditions (S3). If the difference in characteristics is only on the apparatus side (e.g. difference in laser characteristics), OK is returned as a result of the A-process. In this case, the process is terminated at this stage. If there is a difference on characteristics on the disk side, OK is not returned as a result of the A-process.

If OK is not returned as a result of the A-process, the next step is S4, where partial change process for recording pulse condition (second search step; hereinafter "B-process"), which is described later, is performed. In S5, it is judged whether or not the result of the B-process is OK. If OK is returned as a result of the B-process, S3 is performed.

Specifically, based on the judgment that optimal recording conditions are obtained, the recording conditions are set as optimal recording conditions. On the other hand, if OK is not returned as a result of the B-process, there is a possibility that currently used track is defective. Therefore, a target of control is moved to another track (S6), and the process is executed again from S1.

Figure 7:
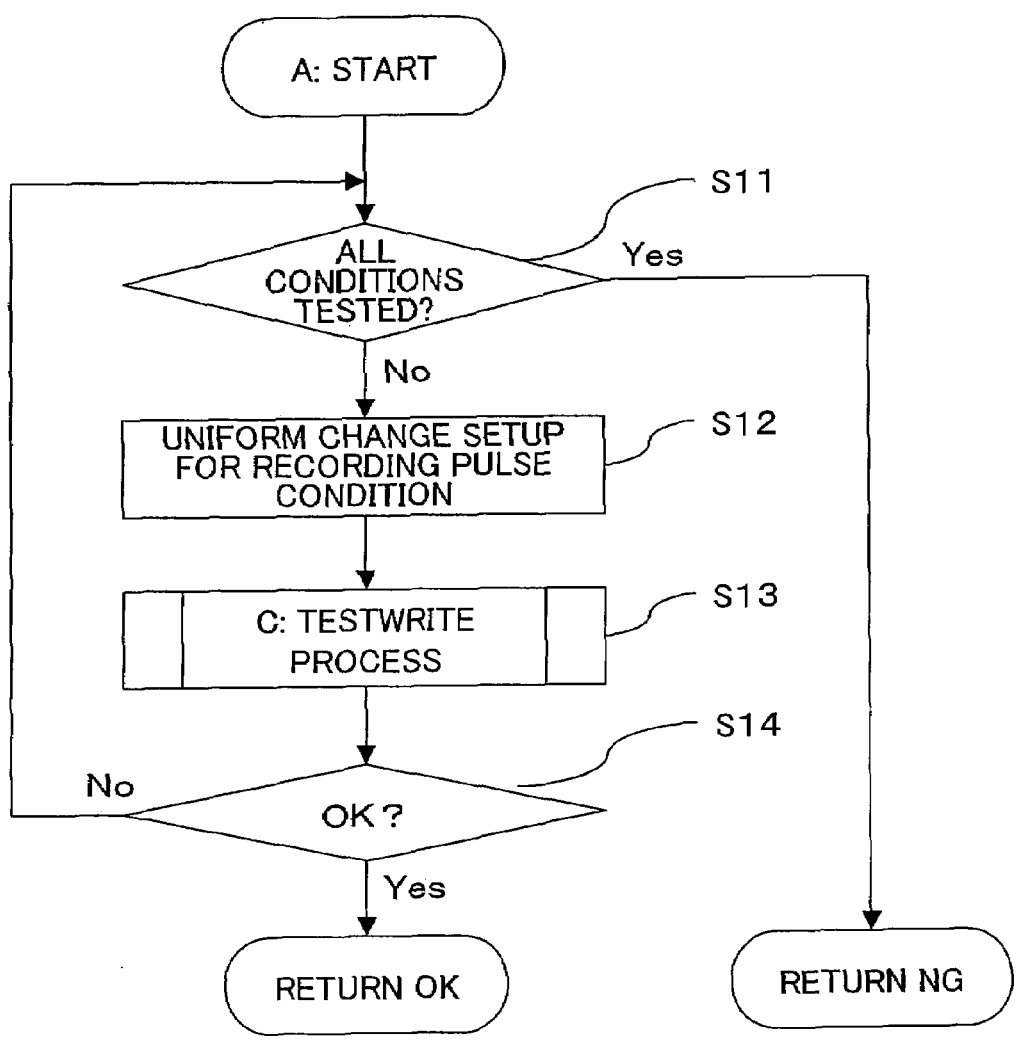
FIG. 7 is a flowchart illustrating uniform change process for recording pulse condition of S1 in the flowchart of FIG. 1.

With reference to the flowchart of FIG. 7, the following describes an operation procedure for the uniform change process for recording pulse condition (first search step; A-process). In the beginning of the A-process, it is judged whether or not all values of the amount of change within a predetermined range have been used, that is, whether or not all amounts of change within a predetermined range have been used for predetermined parameter(s) among a plurality of recording parameters constituting a recording pulse condition (S11). For example, if it is determined that 1 ns, 2 ns, 3 ns, −1 ns, −2 ns, and −3 ns are to be added in this order to the leading part pulse width Ttop and to the middle part pulse width Tmp uniformly, it is judged NO (all conditions have not been used) until these six change patterns of change are added.

If all conditions have not been used, S12 is performed. Specifically, the recording pulse conditions corresponding to all mark lengths (predetermined recording pulse parameters) are set after they are changed uniformly. In uniformly changing the pulse widths in S12, it is preferable to increase the pulse widths first. This is because, as shown in FIG. 10, the error rate is closer to the standard condition when the pulse widths are increased by 2 ns, than when the pulse widths are decreased by 2 ns.

Then, by using the recording pulse conditions set in S12, testwrite process (hereinafter "C-process"), which is described later, is performed (S13). It is judged whether or not OK is returned as a result of the C-process (S14). If OK is returned, OK is returned as a result of the A-process. On the other hand, if OK is not returned as a result of the C-process, S11 is performed again. Specifically, it is judged whether or not all conditions to be executed have been used. If there is any amount of change not tested yet, S12 is performed. If all amounts of change to be tested have been tested, that is, if all conditions have been tested, NG is returned as a result of the A-process.

In FIG. 7, the testwrite is performed while changing the amount of change uniformly added to the predetermined recording pulse parameters, and NG is returned as a result of the A-process if the judgment is not OK. Instead of this arrangement, however, S11 to S14 of FIG. 7 may be repeated while changing the amount of change uniformly added, and changing the recording pulse parameters for which the testwrite is performed.

Figure 8:
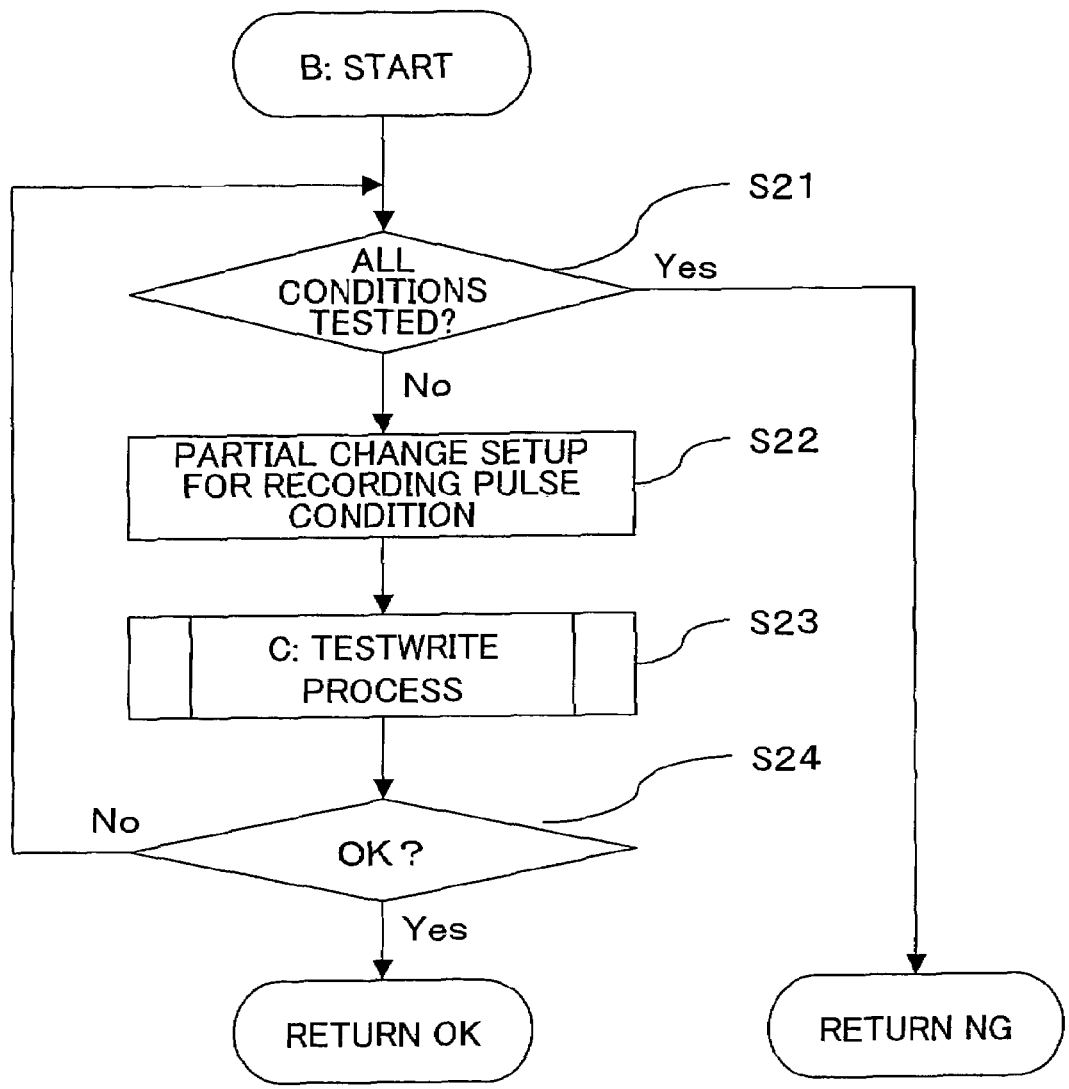
FIG. 8 is a flowchart illustrating partial change process for recording pulse condition of S4 in the flowchart of FIG. 1.

With reference to the flowchart of FIG. 8, the following describes an operation procedure for the partial change process for recording pulse condition (second search step; B-process). In the beginning of the B-process, it is judged whether or not all values of the amount of change within a predetermined range have been used, that is, whether or not all amounts of change within a predetermined range have been used for predetermined parameter(s) among a plurality of recording parameters constituting the recording pulse condition (S21). For example, if it is determined that 1 ns, 2 ns, 3 ns, −1 ns, −2 ns, and −3 ns are to be added in this order to the leading part pulse width Ttop and to the middle part pulse width Tmp uniformly, it is judged NO (all conditions have not been used) until these six patterns of change are added.

If all conditions have not been used, S22 is performed. Specifically, a recording pulse condition corresponding to at least one mark length (predetermined recording pulse parameter(s)) is set after it is changed. As in S12, it is preferable in S22 to increase the pulse widths first, in uniformly changing the pulse widths in S22.

Then, by using the recording pulse condition set in S22, testwrite process (hereinafter "C-process"), which is described later, is performed (S23). It is judged whether or not OK is returned as a result of the C-process (S24). If OK is returned, OK is returned as a result of the B-process. On the other hand, if OK is not returned as a result of the C-process, S21 is performed again. Specifically, it is judged whether or not all conditions to be executed have been used. If there is any amount of change not tested yet, S22 is performed. If all amounts of change to be tested have been tested, that is, if all conditions have been tested, NG is returned as a result of the B-process.

In FIG. 8, the testwrite is performed while changing the amount of change added to the predetermined recording pulse parameter(s), and NG is returned as a result of the B-process if the judgment is not OK. Instead of this arrangement, however, S21 to S24 of FIG. 8 may be repeated while changing the amount of change, and changing the recording pulse parameter(s) for which the testwrite is performed. Of course, when the recording pulse conditions are changed, the corresponding mark lengths are switched accordingly.

According to the optical disk drive 1 of the present embodiment, the best recording condition in the A-process is selected and used as a recording condition at the beginning of the B-process. If the result of the A-process is the best when 2 ns is added to the leading part pulse width Ttop and to the middle part pulse width Tmp, the recording condition of adding 2 ns to the leading part pulse width Ttop and to the middle part pulse width Tmp is selected. In this way, OK can be obtained efficiently (in short time) in the B-process.

Figure 18:
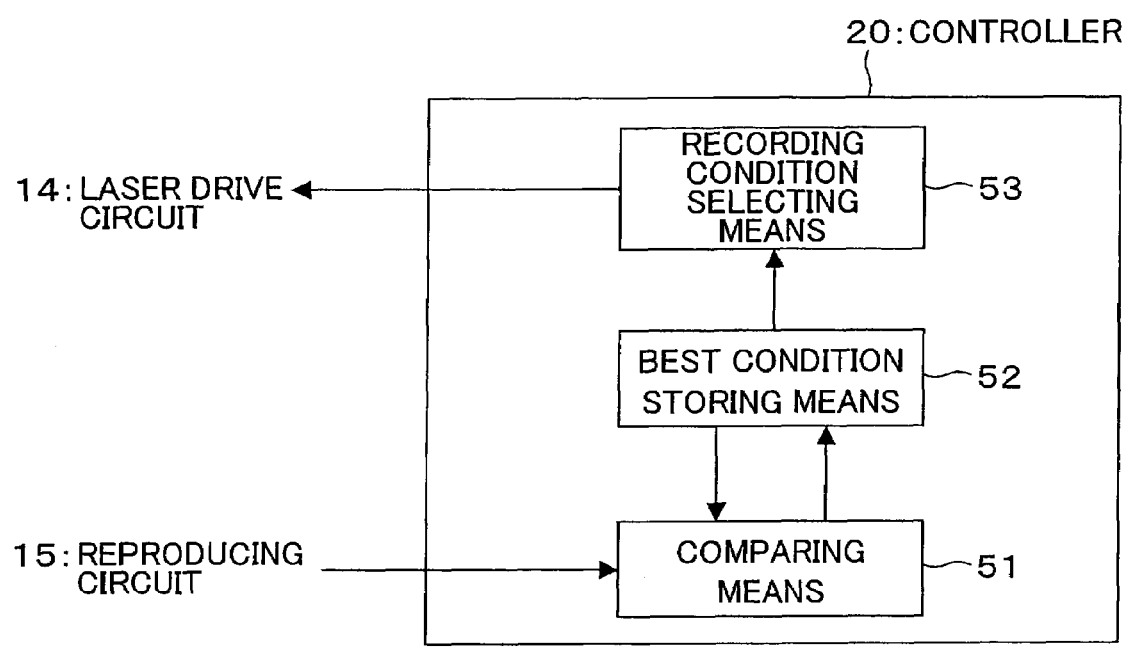
FIG. 18 is a block diagram illustrating an arrangement of a controller of the optical disk drive.

With reference to FIG. 18, the following describes arrangement and operation of the controller 20 of the optical disk apparatus 1. The controller 20 includes comparing means 51, best condition storing means 52, and recording condition selecting means 53. The comparator 51 makes a comparison based on the quality of the reproduction signal obtained from the reproduction circuit 15 of FIG. 2, and judges whether or not the recording condition under which the inputted reproduction signal is obtained is the best recording condition so far. The best condition storing means 52 stores the best recording condition that is judged to be the best recording condition so far by the comparing means 51. By means of comparison with the best recording condition stored in the best condition storing means 52, the comparing means 51 judges whether or not the recording condition under which the inputted reproduction signal is obtained is the best recording condition so far. After the A-process is performed, the recording condition selecting means 53 selects the best recording condition stored in the best condition storing means 52, and sends it to the laser drive circuit 14 as a recording condition for performing the B-process.

In the optical disk drive 1 of the embodiment, the recording condition that is judged to be the best after the A-process is selected and used as the recording condition at the beginning of the B-process. By thus selecting and using the recording condition that is set in accordance with the result of the A-process as the recording condition at the beginning of the B-process, it is possible to obtain OK efficiently (in short time) in the B-process.

Figure 17:
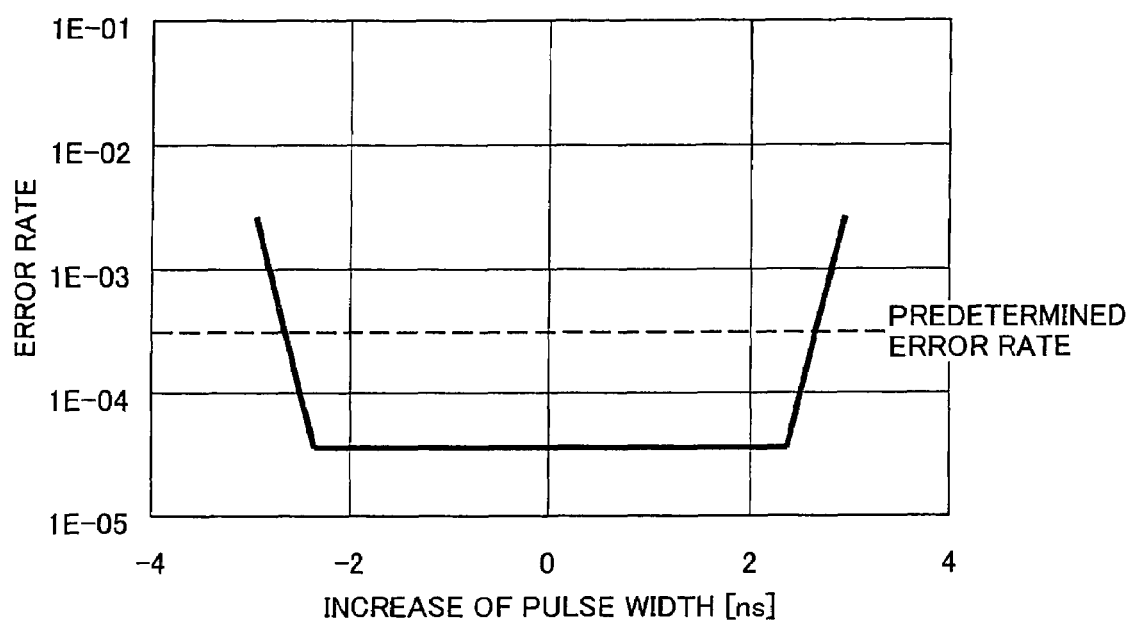
FIG. 17 is a graph showing how a difference in recording pulse influences recording/reproduction performance.

There are cases where, as shown in FIG. 17, the best value of the error rate is almost the same as the error rate around that condition, as a result of changing the leading part pulse width Ttop and the middle part pulse width Tmp in the A-process. In such cases, a range of a recording pulse condition that fulfills predetermined signal quality (in FIG. 17, the range of a recording pulse condition that gives an error rate not higher than the predetermined error rate indicated by dotted line) may be determined in advance, and a recording condition that is substantially at the center of the range may be selected, for example. According to this arrangement, it is possible to obtain OK efficiently (in short time) in the B-process.

Figure 19:
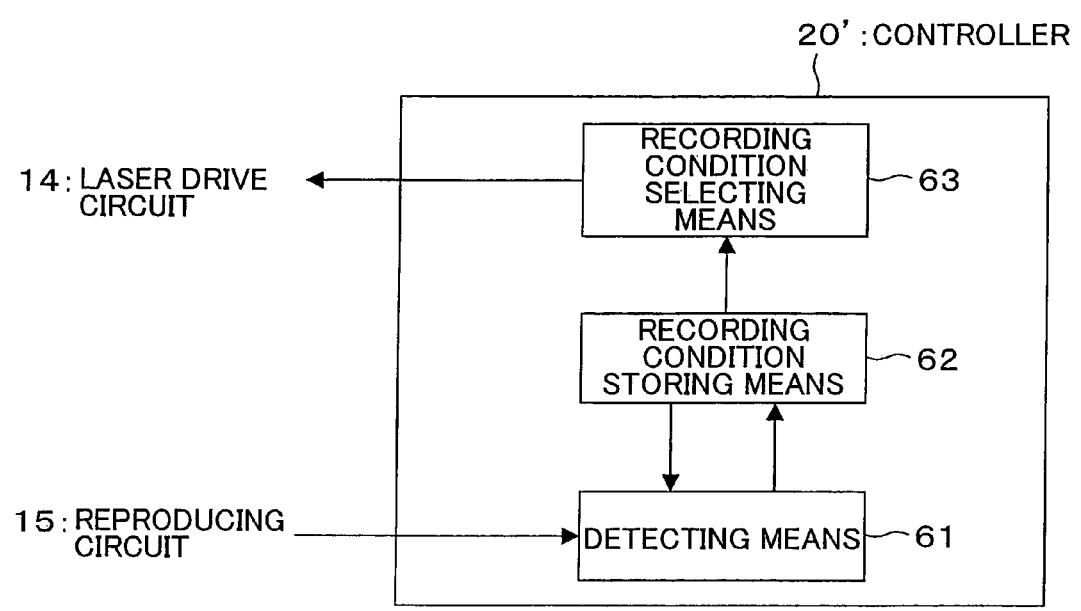
FIG. 19 is a block diagram illustrating a variation example of the arrangement of the controller of the optical disk drive.

FIG. 19 illustrates arrangement and operation of another controller 20' for setting a recording condition used at the time of starting the B-processing in accordance with the result of the A-processing. The controller 20' includes detecting means 61, recording condition storing means 62, and recording condition selecting means 63. Based on the quality of the reproduction signal obtained from the reproducing circuit 15 of FIG. 2, the detecting means 61 detects the fact if the predetermined signal quality is fulfilled by the recording condition under which the inputted reproduction signal is obtained. The recording condition that fulfills the predetermined signal quality is stored in the recording condition storing means 62. After the A-process is performed, the recording condition selecting means 63 determines the range in accordance with the recording condition stored in the recording condition storing means 62. Then, the recording condition selecting means 63 selects a recording condition to be set, and send the recording condition to the laser drive circuit 14 as a recording condition for performing the B-process.

Figure 9:
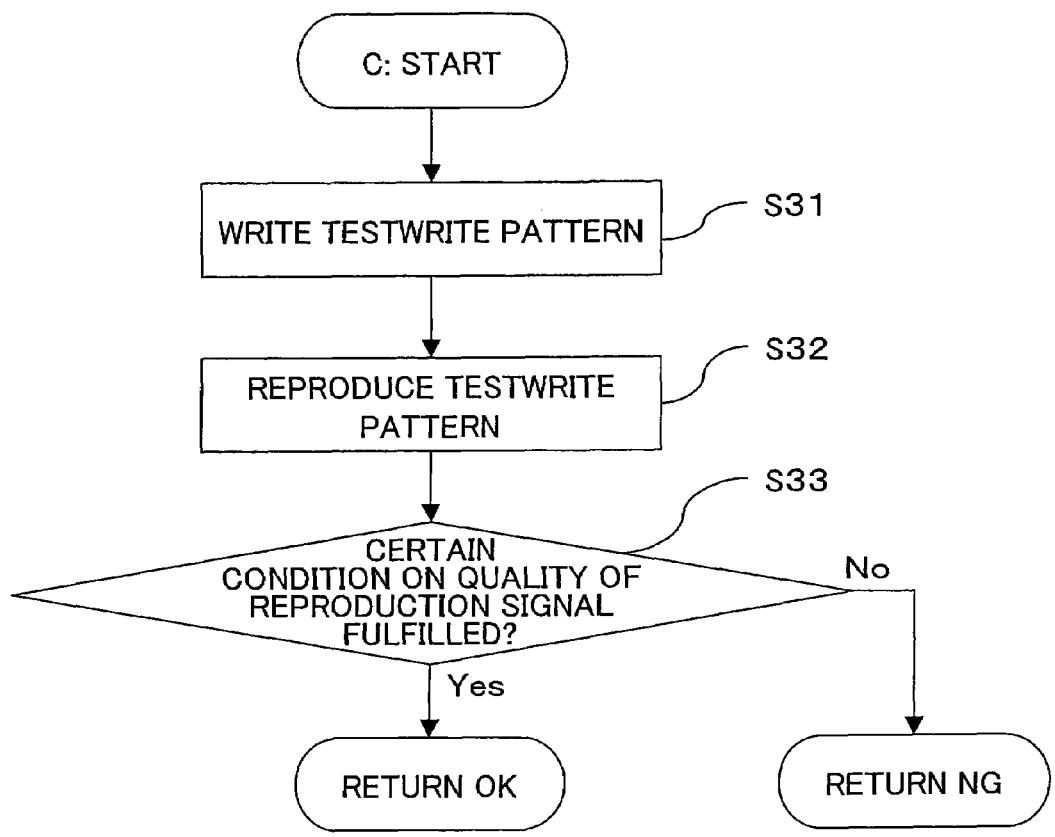
FIG. 9 is a flowchart illustrating an example of testwrite process of S13 in the flowchart of FIG. 7 or S23 in the flowchart of FIG. 8.

Next, with reference to the flowchart of FIG. 9, the testwrite process (C-process) is described. In the beginning of the C-process, testwrite is performed by recording a test pattern in accordance with the recording condition (recording pulse condition and recording power condition) that has been set (S31). Then, the test pattern is reproduced (S32), and it is judged whether or not the quality of the reproduction signal satisfies a predetermined condition (S33). For example, if the error rate is not higher than a predetermined value, it is judged that the quality of the reproduction signal satisfies the predetermined condition, and OK is returned as a result of the C-process. If the quality of the reproduction signal does not satisfy the predetermined condition, NG is returned as a result of the C-process.

The amount detected for judging the quality of the reproduction signal in S32 may be jitter, instead of the error rate. The error rate or the jitter is often used as an indicator of the system margin of the optical disk 10. The error rate or the jitter can indicate a recording state by a value that corresponds to a threshold value that defines the margin of the optical disk 10.

Figure 11:
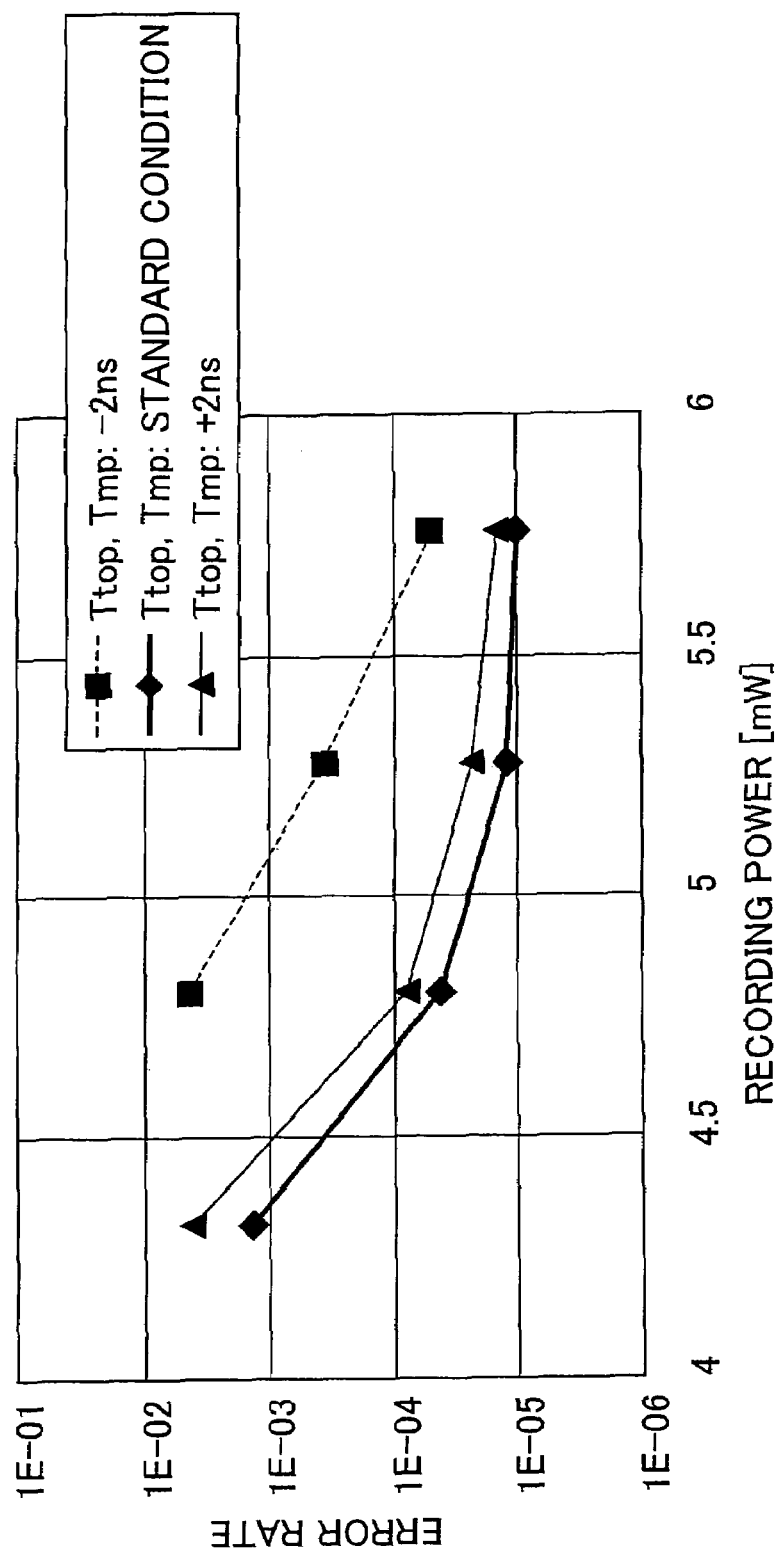
FIG. 11 is a graph showing how a difference in recording pulse influences recording/reproduction performance.

Another C-process (testwrite process) is described below. FIG. 11 illustrates how the error rate changes when the recording power is changed by uniformly adding 2 ns to the leading part pulse width Ttop and to the middle part pulse width Tmp, which are two recording pulse parameters of a predetermined recording pulse condition (standard recording condition) for a disk. From FIG. 11, it is found that the error rate deteriorates when the pulse widths are increased or decreased. It is also found that the recording power that can attain a good error rate is changed by increasing or decreasing the pulse widths. Thus, it is found that, by also changing the recording power in the C-process, it is possible to determine a recording condition that can attain a better error rate than in the case where the recording power is fixed.

Figure 12:
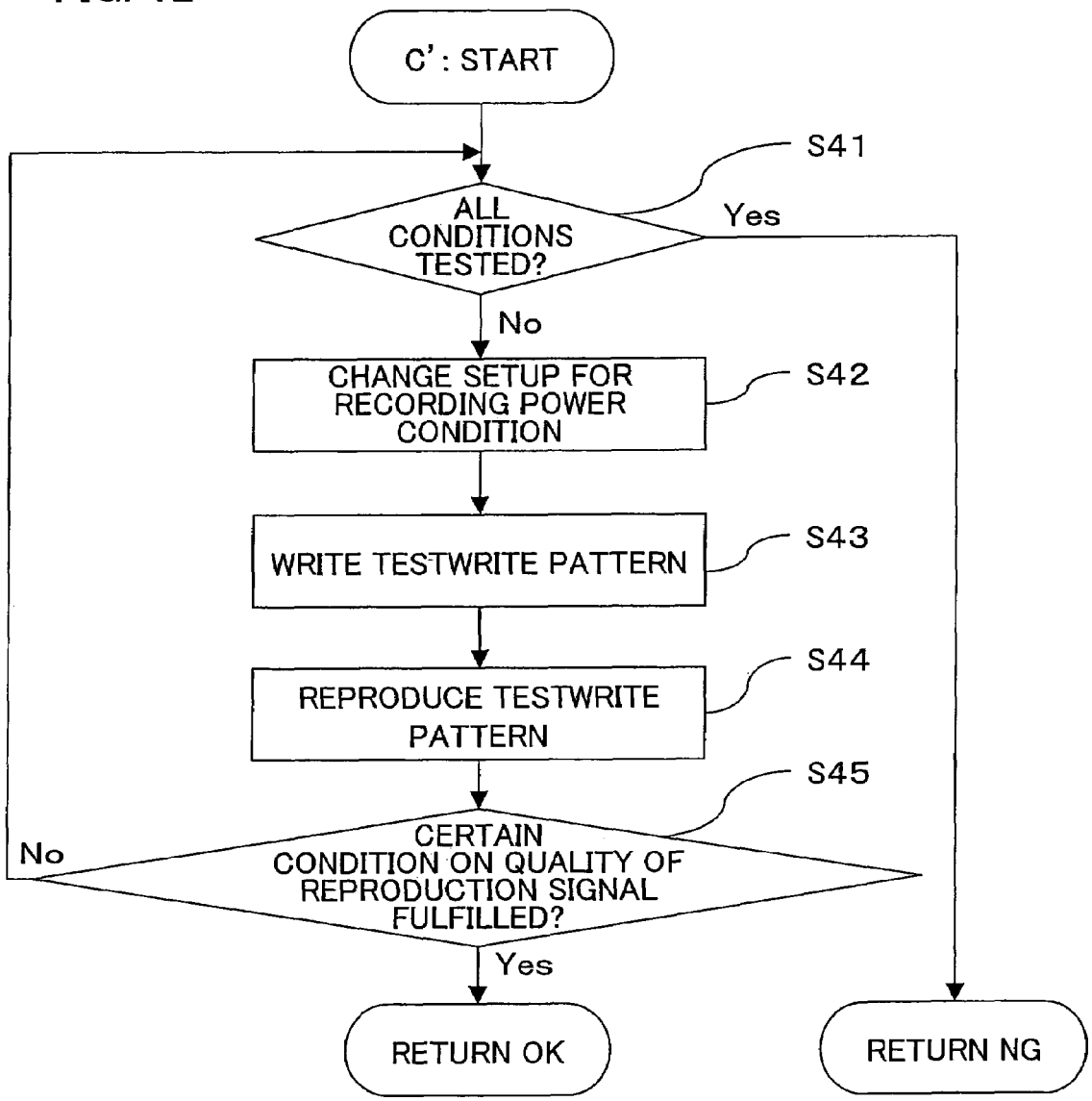
FIG. 12 is a flowchart illustrating another example of the testwrite process of S13 in the flowchart of FIG. 7 or S23 in the flowchart of FIG. 8.

With reference to the flowchart of FIG. 12, the following describes the C-process (testwrite process) in which the recording power condition is changed. First, in S41, it is judged whether or not all values of the amount of change within a predetermined range have been used, that is, whether or not all amounts of change within a predetermined range have been used for predetermined parameter(s) among a plurality of recording parameters constituting the recording pulse condition. If all conditions have not been used, S42 is performed. Specifically, the recording power parameter(s) are set after adding the amount of change to them. Then, a test pattern for use in the testwrite is recorded (S43). The recorded test pattern is reproduced (S44), and it is judged whether or not the quality of the reproduction signal satisfies a predetermined condition (S45). For example, if the error rate is not higher than a predetermined value, it is judged that the quality of the reproduction signal satisfies the predetermined condition, and OK is returned as a result of the C-process. If the quality of the reproduction signal does not satisfy the predetermined condition, NG is returned as a result of the C-process.

The amount detected for judging the quality of the reproduction signal in S42 may be jitter, instead of the error rate. The error rate or the jitter is often used as an indicator of the system margin of the optical disk 10. The error rate or the jitter can indicate a recording state by a value that corresponds to a threshold value that defines the margin of the optical disk 10.

By thus changing the recording power parameter(s) constituting the recording power condition in the C testwrite process, it is possible to optimize not only the recording pulse condition but also the recording power condition. As a result, the quality of the reproduction signal can be further improved.

The C-process to be performed in the A-process or the B-process may be chosen appropriately from the C-process shown by the flowchart of FIG. 9 and the C-process shown by the flowchart of FIG. 12. The C-process performed in the A-process may be different from the C-process performed in the B-process.

Incidentally, the foregoing description does not specify which particular recording pulse parameter(s) among the recording pulse parameters constituting the recording pulse condition are changed in changing the recording pulse condition in the A-process and B-process. The following specifically discusses this point.

For example, if the leading part pulse width Ttop and the middle part pulse width Tmp (these parameters change the mark width of the recorded mark) among the recording pulse parameters constituting the recording pulse condition are changed, there is an effect that the mark width of the recorded mark can be optimized as in the case where the recording power condition is changed.

In the case where the leading part pulse width Ttop and the middle part pulse width Tmp are to be changed, a good error rate can be obtained at high probability by increasing the pulse widths first, before decreasing the pulse widths. In this way, it is possible to set the optimal recording condition more efficiently.

If the leading part pulse start position dTtop (this parameter changes the position of the front edge portion of the recorded mark) among the recording pulse parameters constituting the recording pulse condition is changed, the leading part of the recorded mark moves forward or backward. Therefore, there is an effect that it is possible to optimize the mark length of the recorded mark and the space length of the preceding space.

If the end part pulse end position dTend (this parameter changes the position of the back edge portion of the recorded mark) among the recording pulse parameters constituting the recording pulse condition is changed, the end position of the recorded mark moves forward or backward. Therefore, there is an effect that it is possible to optimize the mark length of the recorded mark and the space length of the following space.

In the case where both the end part pulse end position dTend (this parameter changes the position of the back edge portion of the recorded mark) and the leading part pulse start position dTtop (this parameter changes the position of the front edge portion of the recorded mark) among the recording pulse parameters constituting the recording pulse condition are changed, the optical condition can be set efficiently by changing the end part pulse end position dTend first.

Since the leading part pulse start position dTtop is a start position of the leading pulse width Ttop, there is a possibility that the influence of the difference of the leading part pulse start position dTtop can be decreased by correcting the leading part pulse start position dTtop. Moreover, since the leading part pulse width Ttop is a parameter that influences a recording power parameter, the influence of the leading part pulse start position dTtop can be decreased also by correcting the recording power. Therefore, there is a possibility that the influence of the difference of the leading part pulse start position dTtop can be decreased also by correcting the recording power. On the other hand, since the end part pulse end position dTend is independent from other recording pulse parameters, the difference of the end part pulse end position dTend cannot be corrected easily by changing a recording power parameter. Therefore, by performing testwrite after changing the end part pulse end position dTend first and then changing the leading part pulse start position dTtop, it is possible to set the optimal condition more efficiently.

Figure 13:
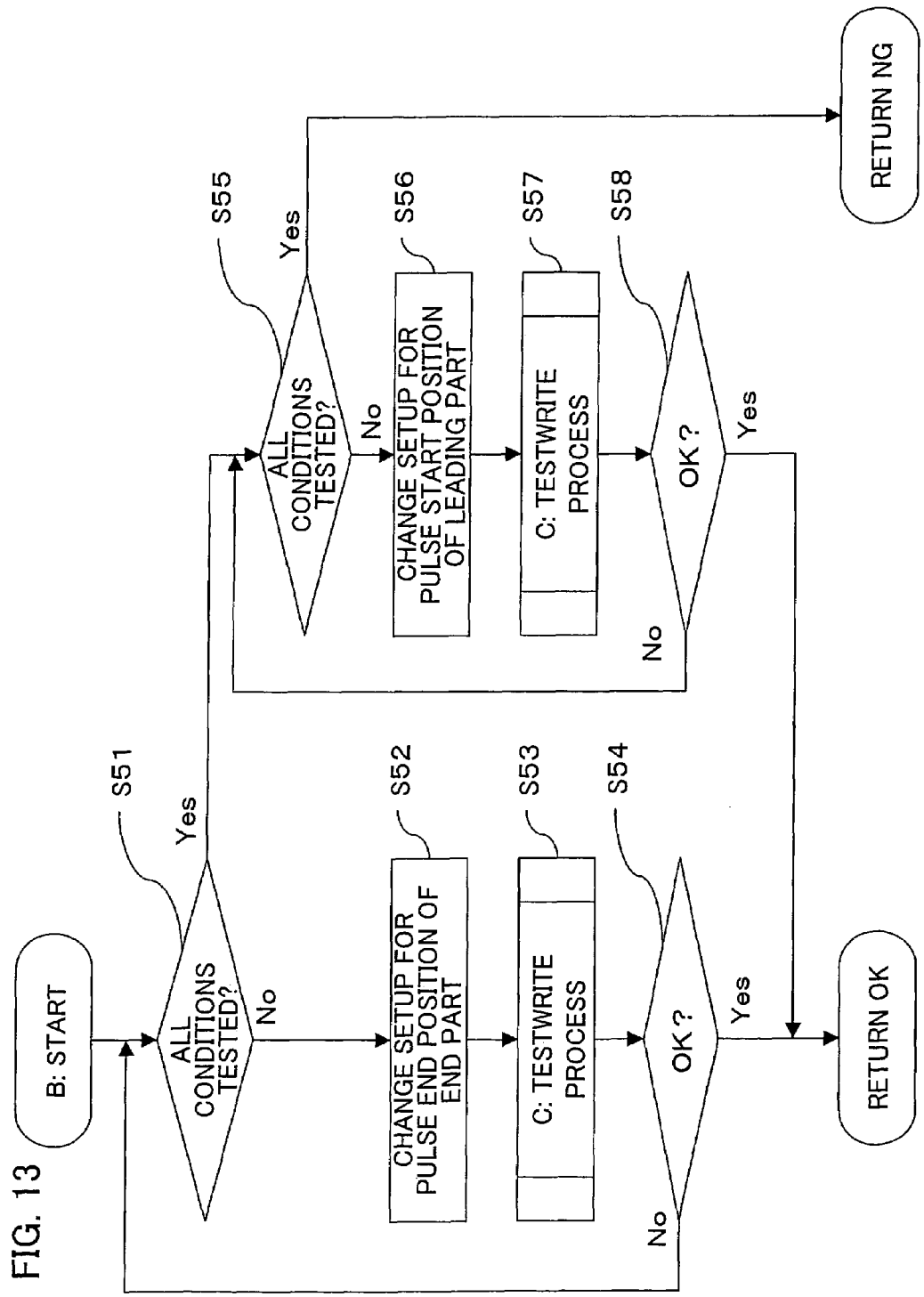
FIG. 13 is a flowchart illustrating an example of the partial change process for recording pulse condition in the flowchart of FIG. 8.

With reference to the flowchart of FIG. 13, the following describes an example where the recording pulse parameters of both the end part pulse end position dTend (this parameter changes the position of the back edge portion of the recorded mark) and the leading part pulse start position dTtop (this parameter changes the position of the front edge portion of the recorded mark) are changed in the B-process.

First, in S51, it is judged whether or not all values of the amount of change within a predetermined range have been used, that is, whether or not all amounts of change within a predetermined range have been used for the end part pulse end position dTend. If all conditions have not been used, S52 is performed. Specifically, the end part pulse end position dTend is set as a recording pulse parameter corresponding to at least one mark length, after the end part pulse end position dTend is changed. By using the parameter set in S52, the testwrite process (C-process) is performed (S53). If OK is returned as a result of the C-process (S54), OK is returned as a result of the B-process. If OK is not returned as a result of the C-process, S51 is performed again, and it is judged whether or not all amounts of change have been used. If there is an amount of change to be used, S52 is performed.

If all amounts of change have been used, S55 is performed. Specifically, it is judged whether or not all values of a predetermined amount of change have been used, that is, whether or not all amounts of change within a predetermined range have been used for the leading part pulse start position dTtop. If all conditions have not been used, S56 is performed. Specifically, as a recording pulse parameter corresponding to at least one mark length, the leading part pulse start position dTtop is set after being changed. By using the parameter set in S56, the testwrite process (C-process) is performed (S57). If OK is returned as a result of the C-process (S58), OK is returned as a result of the B-process. If OK is not returned as a result of the C-process, S55 is performed again, and it is judged whether or not all amounts of change have been used. If there is an amount of change to be used, S56 is performed. On the other hand, if all amounts of change have been used, NG is returned as a result of the B-process.

By thus considering the influence of the difference of the recording pulse parameters, and performing testwrite first for the end part pulse end position dTend, which has a greater influence, and then performing testwrite for the leading part pulse start position dTtop, it is possible to set the optimal condition efficiently.

As an alternative, the following arrangement may be adopted. In the A-process, the leading part pulse width Ttop and the medium pulse width Tmp are changed, and testwrite is performed. The leading part pulse width Ttop and the medium pulse width Tmp are recording pulse parameters that change the mark width of the recorded mark (in other words, recording pulse parameters that influence the recording power parameters). In the B-process, testwrite is performed after the leading part pulse start position dTtop and the end part pulse end position dTend are changed, without changing the start section pulse width Ttop and the middle part pulse width Tmp. Then, (i) the recording pulse condition or (ii) the recording pulse condition and the recording power condition are set so that the quality of the reproduction signal satisfies a predetermined condition.

As described above, in the present embodiment, a recording pulse condition for obtaining a reproduction result which fulfills predetermined signal quality is sought by uniformly changing the standard (predetermined) recording pulse conditions corresponding to all mark lengths and performing testwrite and reproduction (uniform change process for recording pulse condition). That is, the difference in characteristics on the apparatus side, which is likely to occur and has an influence on all mark lengths, is corrected first.

Only when a good reproduction result (reproduction result which fulfills predetermined signal quality) cannot be obtained in the uniform change process for recording pulse condition, a recording pulse condition for obtaining a reproduction result which fulfills predetermined signal quality is sought by changing a recording pulse condition corresponding to at least one mark length or at least one combination, and performing testwrite and reproduction (partial change process for recording pulse condition). The difference in characteristics on the disk side is less likely to occur than the difference in characteristics on the apparatus side. Moreover, since the recording pulse condition(s) needs to be changed with respect to each mark length or combination, it requires a long time. Therefore, by adopting the foregoing order in searching a recording pulse condition for obtaining a reproduction result which fulfills predetermined signal quality, it is possible to set the optimal recording condition (correct the recording condition) efficiently, even if the there are differences in characteristics on both the apparatus side and the disk side.

Furthermore, in the present embodiment, the partial change process for recording pulse condition is performed by using the recording pulse condition that is the closest to fulfilling the predetermined signal quality in the uniform change process for recording pulse condition, which is performed first. Therefore, it is possible to obtain a good reproduction result (reproduction result that satisfies the predetermined signal quality) in the partial change process for recording pulse condition, and thereby shorten the time required for setting the recording condition.

Note that the present embodiment does not limit the scope of the present invention, and that various modifications may be made within the scope of the present invention. For example, although it is preferable to set a recording condition at least once with respect to each track, it is not necessary to do so with respect to all tracks. Instead, a recording condition may be set with respect to each group of a plurality of tracks.

In the present embodiment, the predetermined recording pulse conditions corresponding to all mark lengths are changed. However, this is not always necessary. For example, among all mark lengths from a 2T mark to an 8T mark, recording pulse conditions corresponding to a plurality of recorded mark lengths, such as from a 3T mark to an 8T mark, may be changed. This arrangement also has the effect of reducing the influence of the recording pulse conditions caused primarily due to the difference in laser characteristics, and thereby improving the signal quality.

In this case, if predetermined recording pulse conditions corresponding to not less than half of all mark lengths or not less than half of all combinations of mark length and space length are changed, and testwrite is performed, it is possible to attain an effect of reducing, not less than by half, the influence of the recording pulse conditions caused primarily due to the difference in laser characteristics, and thereby improving the signal quality. The not less than half of all combinations may be any combinations, as long as the combinations are not less than half in number.

Figure 20:
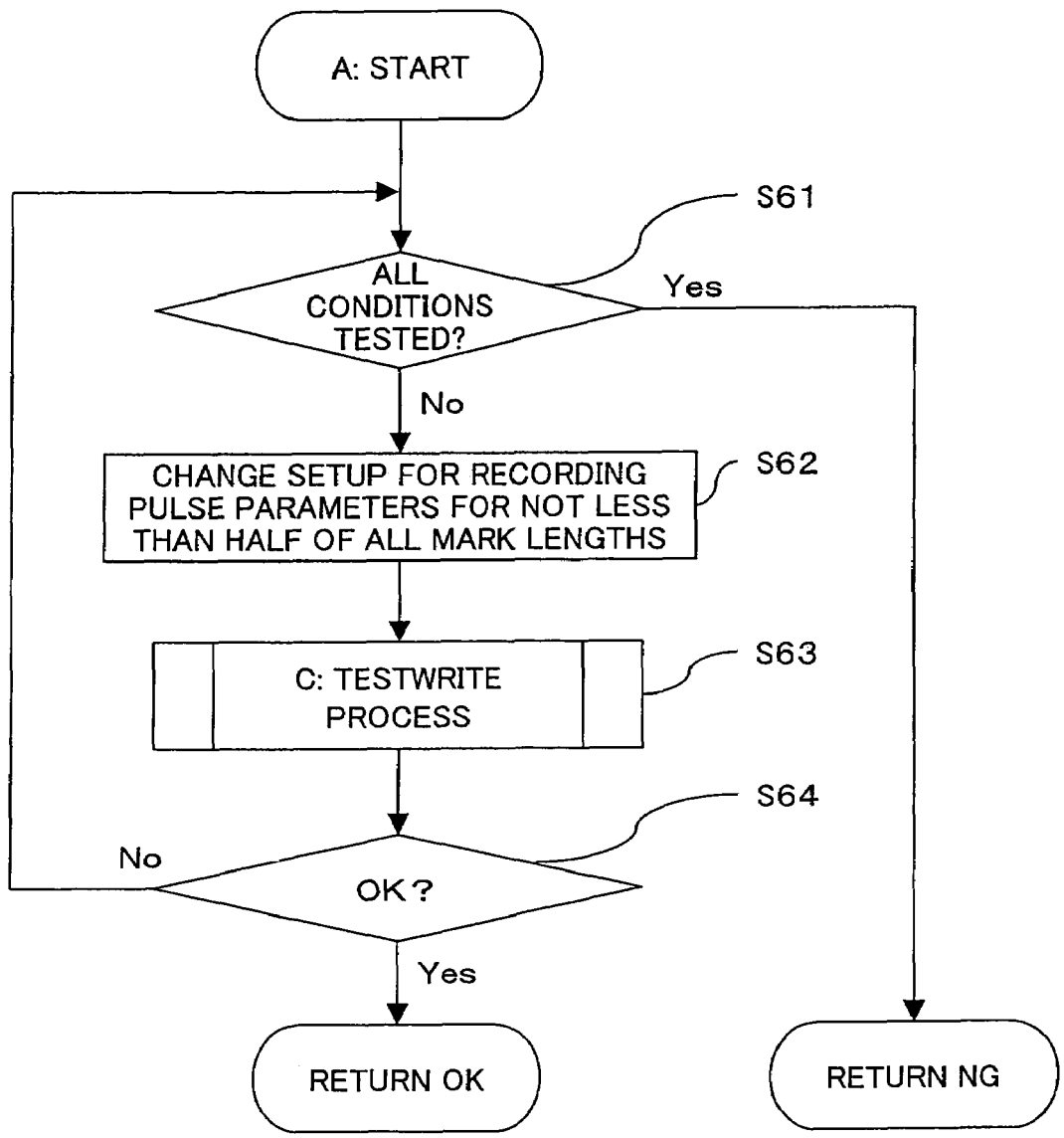
FIG. 20 is a flowchart illustrating change process for recording pulse condition performed instead of the uniform change process for recording pulse condition of S1 in the flowchart of FIG. 1, in accordance with another embodiment of the present invention.

With reference to the flowchart of FIG. 20, the following describes an operation procedure for the A-process performed by an optical disk drive that is a recording and reproducing apparatus in accordance with another embodiment of the present invention, in which predetermined recording pulse conditions corresponding to at least half of all mark lengths are changed, and testwrite is performed, so as to reduce the influence of the difference on the apparatus side. In the present optical disk drive, change processing for recording pulse condition (first search step) is performed as the A-process. In the beginning of the A-process, it is judged whether or not all values of predetermined amounts of change have been used, that is, whether or not all amounts of change within a predetermined range have been used for predetermined parameter(s) among a plurality of recording pulse parameters constituting a recording pulse condition (S61). For example, if it is determined that 1 ns, 2 ns, 3 ns, −1 ns, −2 ns, and −3 ns are to be added in this order to the leading part pulse width Ttop and to the middle part pulse width Tmp, it is judged NO (all conditions have not been used) until these six change patterns of change are added.

If all conditions have not been used, S62 is performed. Specifically, recording pulse conditions corresponding to not less than half of all mark lengths (predetermined recording pulse parameters) are set after they are changed. In changing the pulse widths in S62, it is preferable to increase the pulse widths first. This is because, as shown in FIG. 10, the error rate is closer to the standard condition when the pulse widths are increased by 2 ns, than when the pulse widths are decreased by 2 ns.

Then, by using the recording pulse conditions set in S62, the testwrite process ("C-process") is performed (S63). It is judged whether or not OK is returned as a result of the C-process (S64). If OK is returned, OK is returned as a result of the A-process. On the other hand, if OK is not returned as a result of the C-process, S61 is performed again. Specifically, it is judged whether or not all conditions to be executed have been used. If there is any amount of change not tested yet, S62 is performed. If all amounts of change to be tested have been tested, that is, if all conditions have been tested, NG is returned as a result of the A-process.

Although FIG. 20 illustrates an example where recording pulse conditions corresponding to not less than half of all mark lengths are changed, recording pulse conditions corresponding to not less than half of all combinations of mark length and space length may be changed.

The amount of change added to the recording pulse conditions may not be uniform. For example, instead of uniformly adding −2 ns to the recording pulse conditions, −2 ns, −1 ns, and ±0 ns may be added by mixture to the recording pulse conditions. This arrangement also has the effect of reducing the influence of the recording pulse conditions caused primarily due to the difference in laser characteristics, and thereby improving the signal quality.

Figure 16:
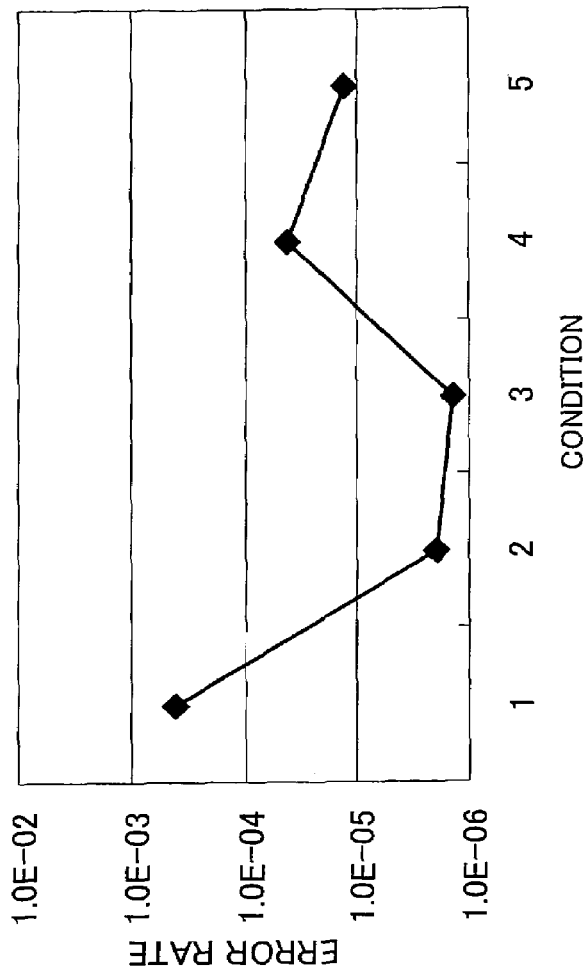
FIG. 16 is a graph showing how a difference in recording pulse influences recording/reproduction performance.

FIG. 16 illustrates how the error rate changes when the leading part pulse width Ttop and the middle part pulse width Tmp, which are two recording pulse parameters among the predetermined recording pulse parameters (standard recording pulse parameters) for a disk, are changed. The horizontal line indicates conditions 1 to 5 that are set, and the vertical axis indicates the error rate in recording and reproduction performed under these recording pulse conditions.

The recording pulse conditions 1 are predetermined recording pulse conditions. The recording pulse conditions 2 are recording pulse conditions in which +2 ns is uniformly added to, among the recording pulse conditions 1, the leading part pulse width Ttop and the middle part pulse width Tmp for all mark lengths. The recording pulse conditions 3 are recording pulse conditions in which +2 ns is added to, among the recording pulse condition 1, the leading part pulse width Ttop and the middle part pulse width Tmp of those marks not shorter than a 3T mark (not all mark lengths). The recording pulse conditions 4 are recording pulse conditions in which, among the recording pulse conditions 1, only the leading part pulse width Ttop of those marks not shorter than a 4T mark is not changed (change of ±0 ns), and +2 ns is added to the leading part pulse width Ttop and the middle part pulse width Tmp of the other marks. The recording pulse conditions 5 are recording pulse conditions in which, among the recording pulse conditions 1, the leading part pulse width Ttop of those marks not shorter than a 4T mark is not changed (change of ±0 ns), and +2 ns is added to the leading part pulse width Ttop and the middle part pulse width Tmp of those marks not shorter than a 3T mark.

As shown in FIG. 16, the error rates in the recording conditions 2 to 5 are better than the error rate in the recording conditions 1. This indicates that it is not always necessary to change recording pulse conditions corresponding to all mark lengths, and it is not always necessary to add the same amount of change uniformly.

In the present embodiment, it is described that, by changing predetermined recording pulse conditions corresponding to all mark lengths, it is possible to attain the effect of reducing the influence of the recording pulse conditions caused primarily due to the difference in laser characteristics, and thereby improving the signal quality. However, instead of changing setting values of the recording pulse conditions, such as the pulse widths, a rise characteristic of a laser and/or a fall characteristic of a laser may be changed in the laser drive circuit 14 (see FIG. 2). Since this arrangement also changes the resultant recording pulse, it is possible to attain the effect of reducing the influence of the recording pulse conditions caused primarily due to the difference in laser characteristics, and thereby improving the signal quality.

The rise characteristic of the laser can be changed by changing at least one of a time for a rise of the laser, a rise start position, and a rise end position. The fall characteristic of the laser can be changed by changing at least one of a time for a fall of the laser, a fall start position, and a fall end position.

Figure 21:
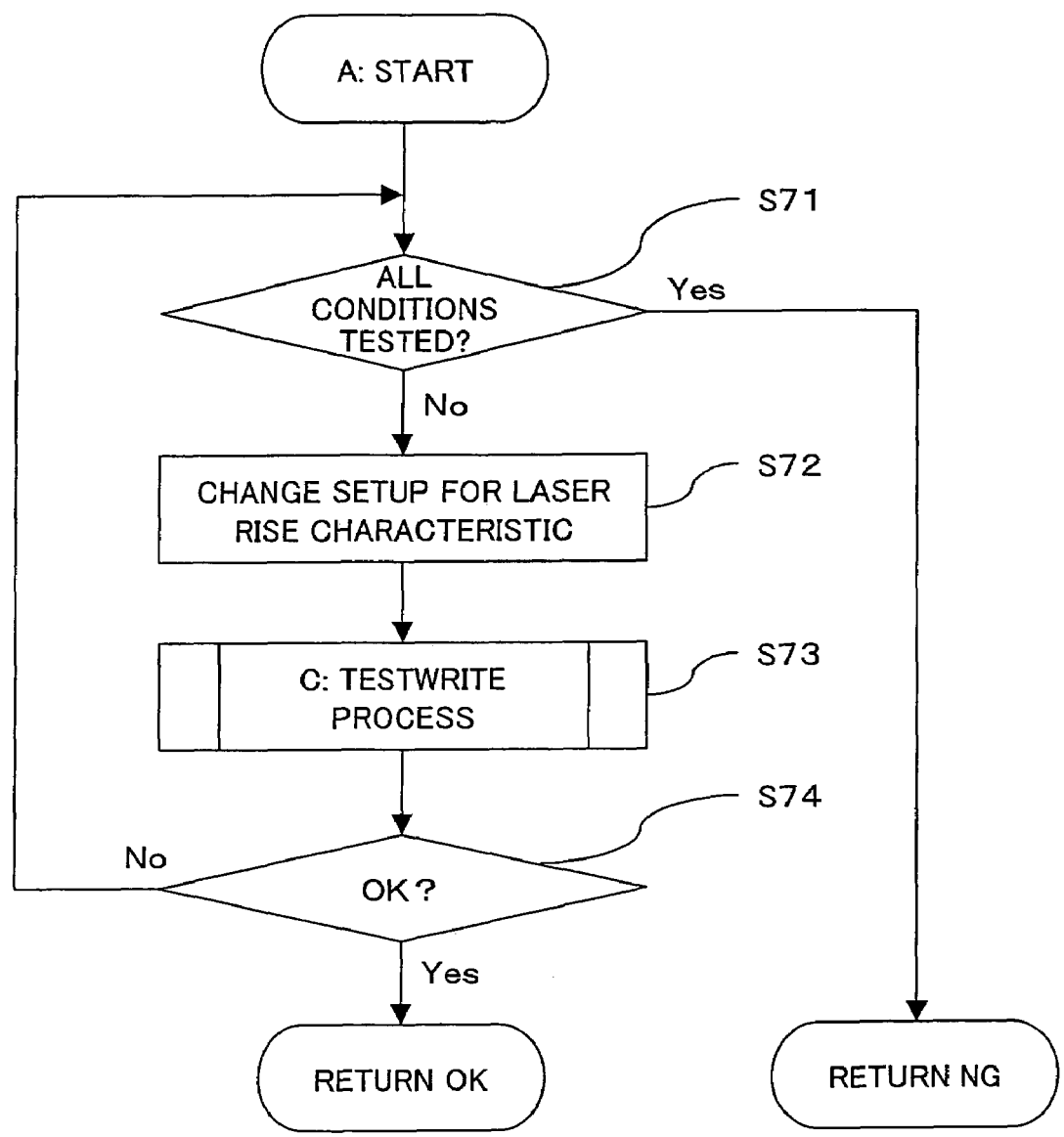
FIG. 21 is a flowchart illustrating change process for laser rise characteristics performed instead of the uniform change process for recording pulse condition of S1 in the flowchart of FIG. 1, in accordance with another embodiment of the present invention.

With reference to the flowchart of FIG. 21, the following describes an operation procedure for the A-process performed by an optical disk drive that is a recording and reproducing apparatus in accordance with yet another embodiment of the present invention, in which the rise characteristic of the laser is changed, and testwrite is performed, so as to reduce the influence of the difference on the apparatus side. In the present optical disk drive, change processing for laser rise characteristic (first search step) is performed as the A-process. In the beginning of the A-process, it is judged whether or not all values of predetermined amounts of change have been used, that is, whether or not all amounts of change within a predetermined range have been used for predetermined parameter(s) among a plurality of parameters constituting the laser rise characteristic (S71). If all conditions have not been used, it is judged NO.

If all conditions have not been used, S72 is performed. Specifically, the laser rise characteristic is set after it is changed. Then, by using the laser rise characteristic set in S72, the testwrite process ("C-process") is performed (S73). It is judged whether or not OK is returned as a result of the C-process (S74). If OK is returned, OK is returned as a result of the A-process. On the other hand, if OK is not returned as a result of the C-process, S71 is performed again. Specifically, it is judged whether or not all conditions to be executed have been used. If there is any amount of change not tested yet, S72 is performed. If all amounts of change to be tested have been tested, that is, if all conditions have been tested NG is returned as a result of the A-process.

Although FIG. 21 illustrates an example where the laser rise characteristic is changed, the laser fall characteristic may be changed. Moreover, both the laser rise characteristic and the laser fall characteristic may be changed.

In the present embodiment, explanation is made by using a recording pulse parameter corresponding to a mark length. However, the explanation is also applicable to a case where a parameter is set with respect to a combination of mark length and space length.

Figure 14:
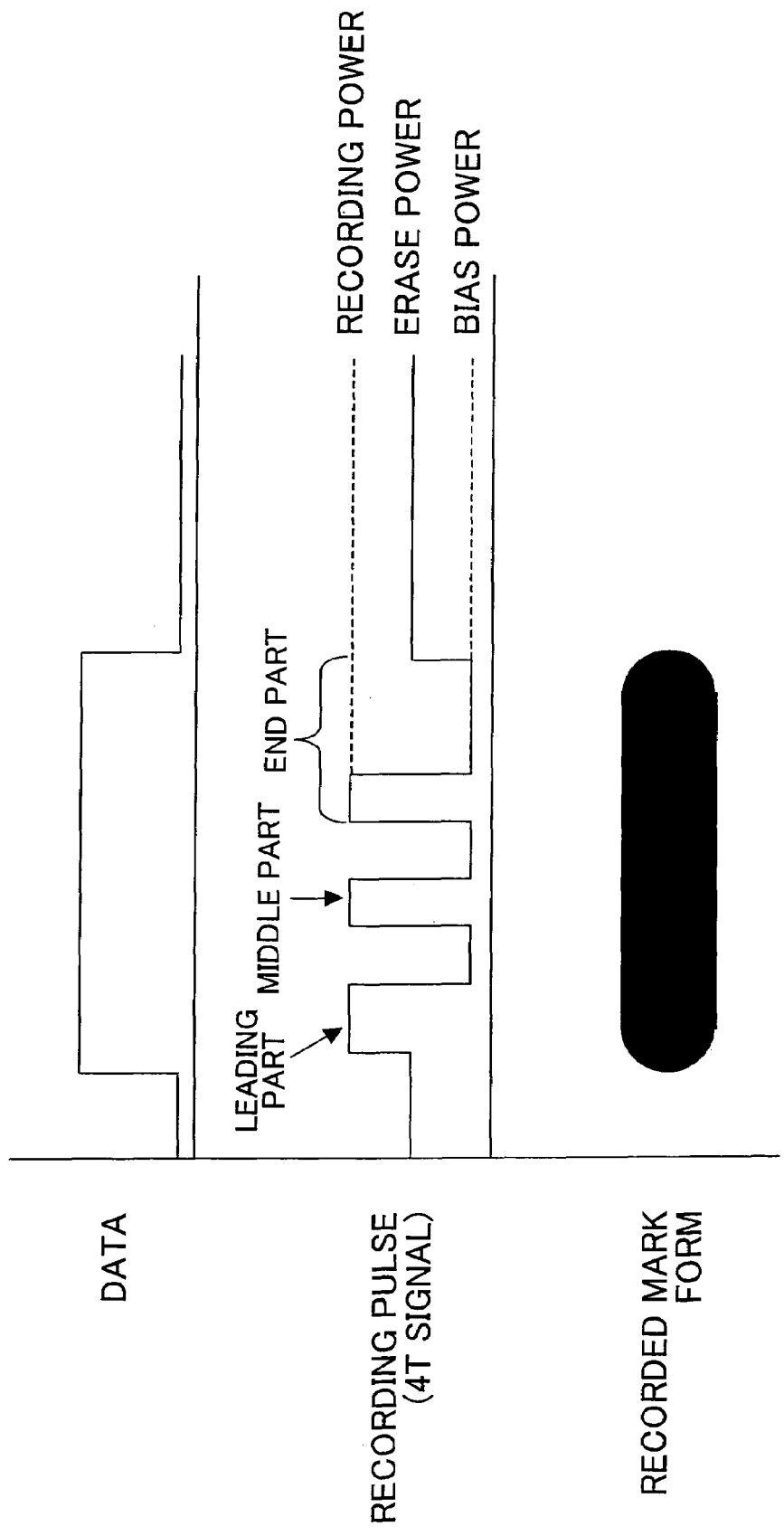
FIG. 14 is a timing chart illustrating a setting of a pulse row corresponding to data.

FIG. 4 illustrates data, a pulse row corresponding thereto, and a recorded mark formed. Among the leading part, middle part, and end part constituting the pulse row, the end part may include a last recording pulse width and a pulse end position, as shown in FIG. 14. In this case, the last recording pulse width also becomes an element that changes the back edge of the recorded mark.

Figure 15:
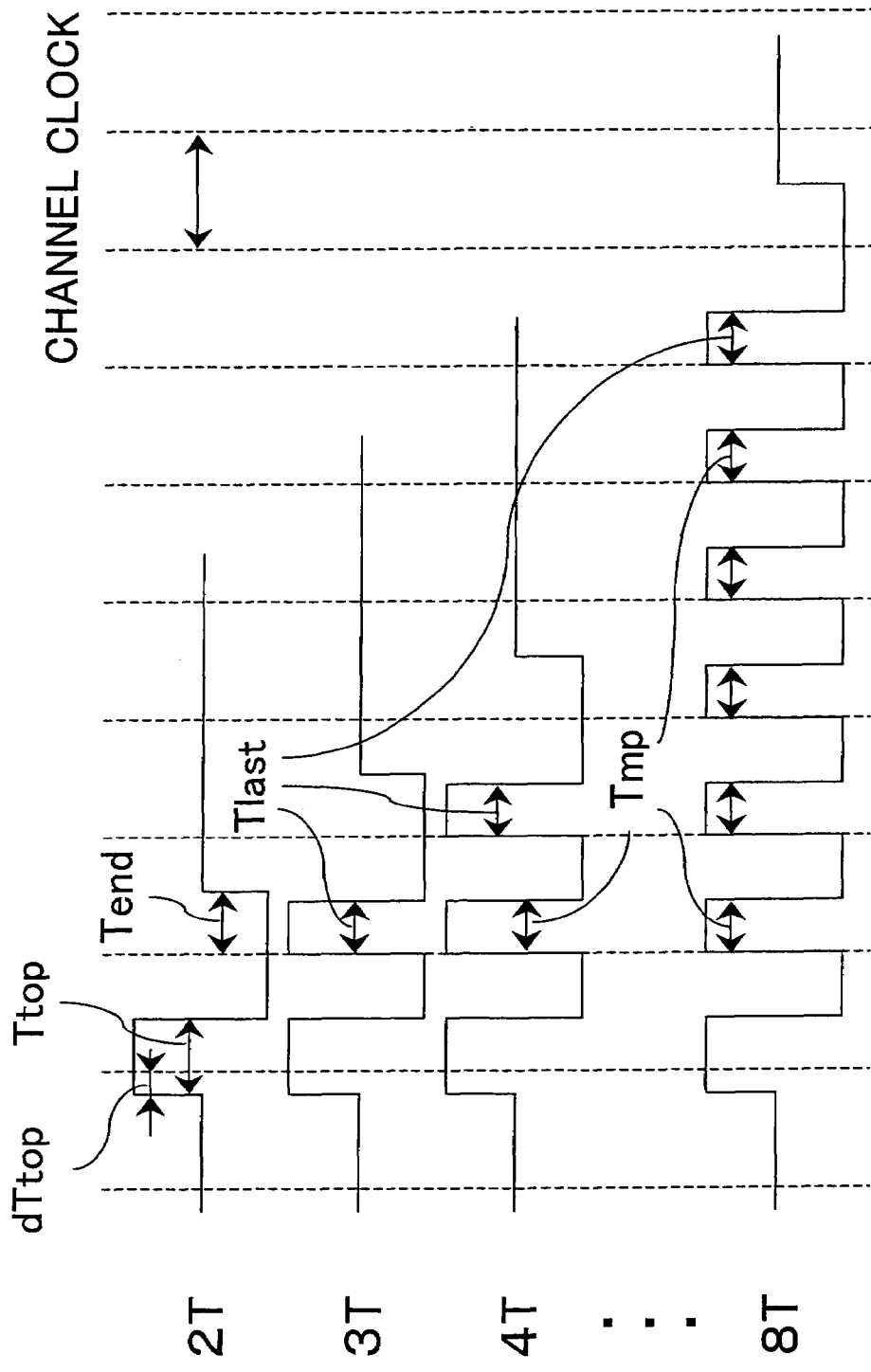
FIG. 15 is a timing chart illustrating pulse rows respectively for forming 2T mark to 8T mark, and various pulse parameters that constitute a recording pulse condition.

FIG. 15 illustrates pulse rows respectively for forming 2T mark to 8T mark and recording pulse conditions for realizing the pulse rows, in the case where the end part includes the last recording pulse width and the pulse end position. Each recording pulse condition includes a combination of plural kinds of elements including the leading part pulse start position dTtop, the leading part pulse width Ttop, the end part pulse end position dTend, the middle part pulse width Tmp, an end part pulse width Tlast, and the like.

The optical disk drive 1 includes, for example, (i) a CPU (Central Processing Unit) as computing means for executing instructions of a program (recording condition setting program) that realizes each function of the controller 20, (ii) a ROM (Read Only Memory) as memory means for storing the program, (iii) a RAM (Random Access Memory) as memory means for developing the program, and (iii) a recording apparatus (recording medium; not shown) as memory means for storing the program and various data.

The object of the present invention can be attained by (i) supplying a recording medium recording computer-readable program codes (executable program, intermediate code program, source program) of a control program, which is software for realizing the foregoing functions, and (ii) reading the program code out of the recording medium and executing the program by using a computer (or CPU or MPU). In this case, since the program codes read out of the recording medium realize the foregoing functions, the recording medium recording the program codes constitute the present invention.

The control program of the present embodiment is a control program for causing the optical disk drive 1 to operate, the program causing the computer to function as each means of the optical disk drive 1.

Thus, it is possible to provide a control program for causing a computer to function as each means described above.

In a computer-readable recording medium of the present embodiment, the control program is recorded.

Thus, it is possible to provide a computer-readable recording medium recording the control program.

In one aspect, the present invention is an optical pulse condition setting method, including the steps of: uniformly changing recording pulse parameters corresponding to all mark lengths; performing first testwrite on an optical disk by using set recording pulse parameters; reproducing a testwrite pattern written in the first writing and detecting a reproduction signal; changing a recording pulse parameter corresponding to at least one mark length, in accordance with a reproduction result obtained after the first testwrite; performing second testwrite on the optical disk by using set recording pulse parameters; reproducing a testwrite pattern written in the second testwrite and detecting a reproduction signal; and determining a recording condition in accordance with a reproduction result obtained after the second testwrite.

In one aspect, the present invention is an optical recording and reproducing apparatus, including: recording pulse parameter uniform change means for uniformly changing recording pulse parameters corresponding to all mark lengths; recording pulse parameter partial change means for changing a recording pulse parameter corresponding to at least one mark length; testwrite means for performing testwrite on an optical disk; reproduction signal detecting means for reproducing a testwrite pattern written in the testwrite and detecting a reproduction signal; and recording condition determining means for determining a recording condition in accordance with a reproduction result, wherein, after testwrite is performed by using recording pulse parameters set by the recording pulse parameter uniform change means, recording pulse parameters are set by using the recording pulse parameter partially setting means in accordance with a reproduction result, and testwrite is performed.

In this case, the testwrite means may perform the testwrite on the optical disk by using a plurality of recording power parameters. Moreover, among the recording pulse parameters, (i) a parameter that influences a recording pulse parameter, (ii) a recording pulse parameter that changes a front edge of a recorded mark, or (iii) a recording pulse parameter that changes a back edge of the recorded mark may be changed. In the case where both the recording pulse parameter that changes the front edge of the recorded mark and the recording pulse parameter that changes the back edge of the recorded mark are changed, the recording pulse parameter that changes the back edge of the recorded mark may be changed before changing the recording pulse parameter that changes the front edge of the recorded mark.

Furthermore, in changing pulse widths, the recording pulse parameter uniform change means and/or the recording pulse parameter partial change means may increase the pulse widths first.

The present invention is applicable, for example, to a recording and reproducing apparatus for handling recordable optical disks such as DVD-RW and DVD-R.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A recording condition setting method for setting a recording condition in a recording method for forming recorded marks by radiating light beam in accordance with a recording pulse condition that includes a plurality of elements and identifies rise and fall positions of a plurality of pulse rows for forming the recorded marks, the recording pulse condition being set with respect to each mark length or each combination of mark length and space length, the recording condition setting method comprising:
   a first search step in which a recording pulse condition for obtaining a reproduction result which fulfills predetermined signal quality is sought by performing testwrite and reproduction after uniformly changing predetermined recording pulse conditions corresponding to all mark lengths or all combinations;
   a second search step in which, if a reproduction result which fulfills predetermined signal quality is not obtained in the first search step, a recording pulse condition for obtaining a reproduction result which fulfills predetermined signal quality is sought by performing testwrite and reproduction after changing a predetermined recording pulse condition corresponding to at least one mark length or at least one combination; and
   a recording condition setting step, in which a recording pulse condition is determined in accordance with a search result of the second search step if the second search step is performed, or in accordance with a search result of the first search step if the second search step is not performed.

2. The recording condition setting method as set forth in claim 1, wherein:
   in the second search step, a recording pulse condition set in accordance with the search result of the first search step is used.

3. The recording condition setting method as set forth in claim 2, wherein:
   in the second search step, a recording pulse condition that is closest to fulfilling the predetermined signal quality in the first search step is used.

4. The recording condition setting method as set forth in claim 2, wherein:
   in the second search step, a recording pulse condition set in accordance with a range of a recording pulse condition that fulfills the predetermined signal quality in the first search step is used.

5. The recording condition setting method as set forth in claim 1, wherein:
   in the first and/or the second search step, a recording power condition for obtaining a good reproduction result is sought by changing, before the testwrite, a recording power condition that defines power of the light beam.

6. The recording condition setting method as set forth in claim 1, wherein:
   in the first and/or the second search step, a recording power condition for obtaining a reproduction result which fulfills predetermined signal quality is sought by changing, before the testwrite, a recording power condition that defines power of the light beam.

7. A recording condition setting method for setting a recording condition in a recording method for forming recorded marks by radiating light beam in accordance with a recording pulse condition that includes a plurality of elements and identifies rise and fall positions of a plurality of pulse rows for forming the recorded marks, the recording pulse condition being set with respect to each mark length or each combination of mark length and space length, the recording condition setting method comprising:
   a first search step in which a recording pulse condition for obtaining a reproduction result which fulfills predetermined signal quality is sought by performing testwrite and reproduction after changing predetermined recording conditions corresponding to not less than half of all mark lengths or not less than half of all combinations of mark length and space length;
   a second search step in which, if a reproduction result which fulfills predetermined signal quality is not obtained in the first search step, a recording pulse condition for obtaining a reproduction result which fulfills predetermined signal quality is sought by performing testwrite and reproduction after changing a predetermined recording pulse condition corresponding to at least one mark length or at least one combination; and
   a recording condition setting step, in which a recording pulse condition is determined in accordance with a search result of the second search step if the second search step is performed, or in accordance with a search result of the first search step if the second search step is not performed.

8. The recording condition setting method as set forth in claim 7, wherein:
   in the second search step, a recording pulse condition set in accordance with the search result of the first search step is used.

9. The recording condition setting method as set forth in claim 8, wherein:
   in the second search step, a recording pulse condition that is closest to fulfilling the predetermined signal quality in the first search step is used.

10. The recording condition setting method as set forth in claim 8, wherein:
    in the second search step, a recording pulse condition set in accordance with a range of a recording pulse condition that fulfills the predetermined signal quality in the first search step is used.

11. The recording condition setting method as set forth in claim 7, wherein:
    in the first and/or the second search step, a recording power condition for obtaining a good reproduction result is sought by changing, before the testwrite, a recording power condition that defines power of the light beam.

12. The recording condition setting method as set forth in claim 7, wherein:

in the first and/or the second search step, a recording power condition for obtaining a reproduction result which fulfills predetermined signal quality is sought by changing, before the testwrite, a recording power condition that defines power of the light beam.

13. A recording condition setting method for setting a recording condition in a recording method for forming recorded marks by radiating light beam in accordance with a recording pulse condition that includes a plurality of elements and identifies rise and fall positions of a plurality of pulse rows for forming the recorded marks, the recording condition setting method comprising:

a first search step in which a recording pulse condition for obtaining a reproduction result which fulfills predetermined signal quality is sought by performing testwrite and reproduction after changing a pulse rise characteristic and/or a pulse fall characteristic of the light beam;

a second search step in which, if a reproduction result which fulfills predetermined signal quality is not obtained in the first search step, a recording pulse condition for obtaining a reproduction result which fulfills predetermined signal quality is sought by performing testwrite and reproduction after changing at least one recording pulse condition; and a recording condition setting step, in which a recording pulse condition is determined in accordance with a search result of the second search step if the second search step is performed, or in accordance with a search result of the first search step if the second search step is not performed.

14. The recording condition setting method as set forth in claim 13, wherein:

in the second search step, a recording pulse condition set in accordance with the search result of the first search step is used.

15. The recording condition setting method as set forth in claim 14, wherein:

in the second search step, a recording pulse condition that is closest to fulfilling the predetermined signal quality in the first search step is used.

16. The recording condition setting method as set forth in claim 14, wherein:

in the second search step, a recording pulse condition set in accordance with a range of a recording pulse condition that fulfills the predetermined signal quality in the first search step is used.

17. The recording condition setting method as set forth in claim 13, wherein:

in the first and/or the second search step, a recording power condition for obtaining a good reproduction result is sought by changing, before the testwrite, a recording power condition that defines power of the light beam.

18. The recording condition setting method as set forth in claim 13, wherein:

in the first and/or the second search step, a recording power condition for obtaining a reproduction result which fulfills predetermined signal quality is sought by changing, before the testwrite, a recording power condition that defines power of the light beam.

19. A recording condition setting apparatus for setting a recording condition in a recording and reproducing apparatus for forming the recorded marks by radiating light beam in accordance with a recording pulse condition that identifies rise and fall positions of a plurality of pulse rows for forming the recorded marks, the recording pulse condition being set with respect to each mark length or each combination of mark length and space length, the recording condition setting apparatus comprising:

first search means for searching a recording pulse condition for obtaining a reproduction result which fulfills predetermined signal quality, by performing testwrite and reproduction after uniformly changing predetermined recording pulse conditions corresponding to all mark lengths or all combinations;

second search means for searching a recording pulse condition for obtaining a reproduction result which fulfills predetermined signal quality, by performing testwrite and reproduction after changing a predetermined recording pulse condition corresponding to at least one mark length or at least one combination; and recording condition determining means for determining a recording pulse condition in accordance with a search result of the second search means if search by the second search means is performed, or in accordance with a search result of the first search means if the search by the second search means is not performed, the recording condition determining means causing the first search means to perform search first, and causing the second search means to perform search if a reproduction result which fulfills predetermined signal quality is not obtained by the first search means.

20. The recording condition setting apparatus as set forth in claim 19, wherein:

the second search means performs search by using a recording pulse condition set in accordance with the search result of the first search means.

21. The recording condition setting apparatus as set forth in claim 20, wherein:

the second search means performs search by using a recording pulse condition that is closest to fulfilling the predetermined signal quality as a result of search by the first search means.

22. The recording condition setting apparatus as set forth in claim 20, wherein:

the second search means performs search by using a recording pulse condition set in accordance with a range of a recording pulse condition that fulfills the predetermined signal quality as a result of search by the first search means.

23. The recording condition setting apparatus as set forth in claim 19, wherein:

the first and/or the second search means searches a recording power condition for obtaining a good reproduction result by changing, before the testwrite, a recording power condition that defines power of the light beam.

24. The recording condition setting method as set forth in claim 19, wherein:

in the first and/or the second search step, a recording power condition for obtaining a reproduction result which fulfills predetermined signal quality is sought by changing, before the testwrite, a recording power condition that defines power of the light beam.

25. The recording condition setting apparatus as set forth in claim 19, wherein:

in changing a recording pulse condition, the first and/or the second search means changes an element of the recording pulse condition that changes a mark width of a recorded mark.

26. The recording condition setting apparatus as set forth in claim 19, wherein:
in changing a recording pulse condition, the first and/or the second search means increases a pulse width before decreasing the pulse width.

27. The recording condition setting apparatus as set forth in claim 19, wherein:
in changing a recording pulse condition, the first and/or the second search means changes an element of the recording pulse condition that changes a position of a front edge of a recorded mark.

28. The recording condition setting apparatus as set forth in claim 19, wherein:
in changing a recording pulse condition, the first and/or the second search means changes an element of the recording pulse condition that changes a position of a back edge of a recorded mark.

29. The recording condition setting apparatus as set forth in claim 19, wherein:
in changing a recording pulse condition, the first and/or the second search means changes an element of the recording pulse condition that changes a position of a back edge of a recorded mark before changing an element of the recording pulse condition that changes a position of a front edge of the recorded mark.

30. The recording condition setting apparatus as set forth in claim 19, wherein:
the predetermined recording pulse conditions are recorded in a recording medium, and read out of the recording medium and used by the first and/or the second search means.

31. The recording condition setting apparatus as set forth in claim 23, wherein:
the predetermined recording power condition is recorded in a recording medium, and read out of the recording medium and used by the first and/or the second search means.

32. The recording condition setting apparatus as set forth in claim 23, wherein:
the predetermined recording pulse conditions and/or the predetermined recording power condition are recorded in a recording medium, and read out of the recording medium and used by the first and/or the second search means.

33. A recording condition setting apparatus for setting a recording condition in a recording and reproducing apparatus for forming the recorded marks by radiating light beam in accordance with a recording pulse condition that identifies rise and fall positions of a plurality of pulse rows for forming the recorded marks, the recording pulse condition being set with respect to each mark length or each combination of mark length and space length, the recording condition setting apparatus comprising:
first search means for searching a recording pulse condition for obtaining a reproduction result which fulfills predetermined signal quality, by performing testwrite and reproduction after changing predetermined recording conditions corresponding to not less than half of all mark lengths or not less than half of all combinations of mark length and space length;
second search means for searching a recording pulse condition for obtaining a reproduction result which fulfills predetermined signal quality, by performing testwrite and reproduction after changing a predetermined recording pulse condition corresponding to at least one mark length or at least one combination; and
recording condition determining means for determining a recording pulse condition in accordance with a search result of the second search means if search by the second search means is performed, or in accordance with a search result of the first search means if the search by the second search means is not performed, the recording condition determining means causing the first search means to perform search first, and causing the second search means to perform search if a reproduction result which fulfills predetermined signal quality is not obtained by the first search means.

34. The recording condition setting apparatus as set forth in claim 33, wherein:
the second search means performs search by using a recording pulse condition set in accordance with the search result of the first search means.

35. The recording condition setting apparatus as set forth in claim 34, wherein:
the second search means performs search by using a recording pulse condition that is closest to fulfilling the predetermined signal quality as a result of search by the first search means.

36. The recording condition setting apparatus as set forth in claim 34, wherein:
the second search means performs search by using a recording pulse condition set in accordance with a range of a recording pulse condition that fulfills the predetermined signal quality as a result of search by the first search means.

37. The recording condition setting apparatus as set forth in claim 33, wherein:
the first and/or the second search means searches a recording power condition for obtaining a good reproduction result by changing, before the testwrite, a recording power condition that defines power of the light beam.

38. The recording condition setting apparatus as set forth in claim 33, wherein:
in the first and/or the second search step, a recording power condition for obtaining a reproduction result which fulfills predetermined signal quality is sought by changing, before the testwrite, a recording power condition that defines power of the light beam.

39. The recording condition setting apparatus as set forth in claim 33, wherein:
in changing a recording pulse condition, the first and/or the second search means changes an element of the recording pulse condition that changes a mark width of a recorded mark.

40. The recording condition setting apparatus as set forth in claim 33, wherein:
in changing a recording pulse condition, the first and/or the second search means increases a pulse width before decreasing the pulse width.

41. The recording condition setting apparatus as set forth in claim 33, wherein:
in changing a recording pulse condition, the first and/or the second search means changes an element of the recording pulse condition that changes a position of a front edge of a recorded mark.

42. The recording condition setting apparatus as set forth in claim 33, wherein:
in changing a recording pulse condition, the first and/or the second search means changes an element of the recording pulse condition that changes a position of a back edge of a recorded mark.

43. The recording condition setting apparatus as set forth in claim 33, wherein:
in changing a recording pulse condition, the first and/or the second search means changes an element of the recording pulse condition that changes a position of a back edge of a recorded mark before changing an element of the recording pulse condition that changes a position of a front edge of the recorded mark.

44. The recording condition setting apparatus as set forth in claim 33, wherein:
the predetermined recording pulse conditions are recorded in a recording medium, and read out of the recording medium and used by the first and/or the second search means.

45. The recording condition setting apparatus as set forth in claim 37, wherein:
the predetermined recording power condition is recorded in a recording medium, and read out of the recording medium and used by the first and/or the second search means.

46. The recording condition setting apparatus as set forth in claim 37, wherein:
the predetermined recording pulse conditions and/or the predetermined recording power condition are recorded in a recording medium, and read out of the recording medium and used by the first and/or the second search means.

47. A recording condition setting apparatus for setting a recording condition in a recording and reproducing apparatus for forming the recorded marks by radiating light beam in accordance with a recording pulse condition that identifies rise and fall positions of a plurality of pulse rows for forming the recorded marks, the recording pulse condition being set with respect to each mark length or each combination of mark length and space length, the recording condition setting apparatus comprising:
first search means for searching a recording pulse condition for obtaining a reproduction result which fulfills predetermined signal quality, by performing testwrite and reproduction after changing a pulse rise characteristic and/or a pulse fall characteristic of the light beam;
second search means for searching a recording pulse condition for obtaining a reproduction result which fulfills predetermined signal quality, by performing testwrite and reproduction after changing at least one recording pulse condition; and
recording condition determining means for determining a recording pulse condition in accordance with a search result of the second search means if search by the second search means is performed, or in accordance with a search result of the first search means if the search by the second search means is not performed, the recording condition determining means causing the first search means to perform search first, and, if a reproduction result which fulfills predetermined signal quality is not obtained by the first search means, setting a recording pulse condition in accordance with the search result of the first search means and causing the second search means to perform search in accordance with the recording pulse condition set by the first search means.

48. The recording condition setting apparatus as set forth in claim 47, wherein:
the second search means performs search by using the recording pulse condition set in accordance with the search result of the first search means.

49. The recording condition setting apparatus as set forth in claim 48, wherein:
the second search means performs search by using a recording pulse condition that is closest to fulfilling the predetermined signal quality as a result of search by the first search means.

50. The recording condition setting apparatus as set forth in claim 48, wherein:
the second search means performs search by using a recording pulse condition set in accordance with a range of a recording pulse condition that fulfills the predetermined signal quality as a result of search by the first search means.

51. The recording condition setting apparatus as set forth in claim 47, wherein:
the first and/or the second search means searches a recording power condition for obtaining a good reproduction result by changing, before the testwrite, a recording power condition that defines power of the light beam.

52. The recording condition setting method as set forth in claim 47, wherein:
in the first and/or the second search step, a recording power condition for obtaining a reproduction result which fulfills predetermined signal quality is sought by changing, before the testwrite, a recording power condition that defines power of the light beam.

53. The recording condition setting apparatus as set forth in claim 47, wherein:
in changing a recording pulse condition, the first and/or the second search means changes an element of the recording pulse condition that changes a mark width of a recorded mark.

54. The recording condition setting apparatus as set forth in claim 47, wherein:
in changing a recording pulse condition, the first and/or the second search means increases a pulse width before decreasing the pulse width.

55. The recording condition setting apparatus as set forth in claim 47, wherein:
in changing a recording pulse condition, the first and/or the second search means changes an element of the recording pulse condition that changes a position of a front edge of a recorded mark.

56. The recording condition setting apparatus as set forth in claim 47, wherein:
in changing a recording pulse condition, the first and/or the second search means changes an element of the recording pulse condition that changes a position of a back edge of a recorded mark.

57. The recording condition setting apparatus as set forth in claim 47, wherein:
in changing a recording pulse condition, the first and/or the second search means changes an element of the recording pulse condition that changes a position of a back edge of a recorded mark before changing an element of the recording pulse condition that changes a position of a front edge of the recorded mark.

58. The recording condition setting apparatus as set forth in claim 47, wherein:
the predetermined recording pulse conditions are recorded in a recording medium, and read out of the recording medium and used by the first and/or the second search means.

59. The recording condition setting apparatus as set forth in claim 51, wherein:
the predetermined recording power condition is recorded in a recording medium, and read out of the recording medium and used by the first and/or the second search means.

60. The recording condition setting apparatus as set forth in claim 51, wherein:
the predetermined recording pulse conditions and/or the predetermined recording power condition are recorded in a recording medium, and read out of the recording medium and used by the first and/or the second search means.

61. A recording and reproducing apparatus, comprising: the recording condition setting apparatus as set forth in claim 19.

62. A recording and reproducing apparatus, comprising: the recording condition setting apparatus as set forth in claim 33.

63. A recording and reproducing apparatus, comprising: the recording condition setting apparatus as set forth in claim 47.

64. A recording condition setting program for causing the recording condition setting apparatus as set forth in claim 19 to operate, the program causing a computer to function as each means of the recording condition setting apparatus.

65. A recording condition setting program for causing the recording condition setting apparatus as set forth in claim 33 to operate, the program causing a computer to function as each means of the recording condition setting apparatus.

66. A recording condition setting program for causing the recording condition setting apparatus as set forth in claim 47 to operate, the program causing a computer to function as each means of the recording condition setting apparatus.

67. A computer-readable recording medium in which the recording condition setting program as set forth in claim 64 is recorded.

68. A computer-readable recording medium in which the recording condition setting program as set forth in claim 65 is recorded.

69. A computer-readable recording medium in which the recording condition setting program as set forth in claim 66 is recorded.

* * * * *